United States Patent
Fish et al.

(10) Patent No.: US 12,424,218 B2
(45) Date of Patent: Sep. 23, 2025

(54) DIGITAL ASSISTANT RESPONSE FRAMEWORK

(71) Applicant: Apple Inc., Cupertino, CA (US)

(72) Inventors: Rebecca P. Fish, San Francisco, CA (US); Neal S. Ellis, San Francisco, CA (US); Aswini Ramesh, San Jose, CA (US); Martin Reddy, Santa Rosa, CA (US); Patchaya B. Seilaudom, Cupertino, CA (US); Andrew P. Tennant, San Jose, CA (US)

(73) Assignee: Apple Inc., Cupertino, CA (US)

( * ) Notice: Subject to any disclaimer, the term of this patent is extended or adjusted under 35 U.S.C. 154(b) by 341 days.

(21) Appl. No.: 17/944,752

(22) Filed: Sep. 14, 2022

(65) Prior Publication Data

US 2023/0386460 A1 Nov. 30, 2023

Related U.S. Application Data

(60) Provisional application No. 63/346,633, filed on May 27, 2022.

(51) Int. Cl.
*G10L 15/00* (2013.01)
*G10L 15/22* (2006.01)
*G10L 21/00* (2013.01)

(52) U.S. Cl.
CPC .............. *G10L 15/22* (2013.01); *G10L 21/00* (2013.01); *G10L 2015/223* (2013.01); *G10L 2015/225* (2013.01)

(58) Field of Classification Search
CPC .......... G10L 15/22; G10L 15/00; G10L 15/06; G10L 15/08; G10L 15/18; G10L 15/1815;
(Continued)

(56) References Cited

U.S. PATENT DOCUMENTS 7,562,007 B2 7/2009 Hwang
7,801,728 B2 9/2010 Ben-David et al.
(Continued)

FOREIGN PATENT DOCUMENTS

CN 101939740 A 1/2011
CN 102681761 A 9/2012
(Continued)

OTHER PUBLICATIONS

M. Perakakis and A. Potamianos, "A Study in Efficiency and Modality Usage in Multimodal Form Filling Systems," in IEEE Transactions on Audio, Speech, and Language Processing, vol. 16, No. 6, pp. 1194-1206, Aug. 2008. (Year: 2008).*
(Continued)

*Primary Examiner* — Edgar X Guerra-Erazo
(74) *Attorney, Agent, or Firm* — DLA Piper LLP (US)

(57) ABSTRACT

Systems and processes for operating an intelligent automated assistant are provided. For example, an electronic device can provide an output in an audio, visual, or mixed mode. In one example process, an output mode is selected, and, in response to determining that an output is to be provided to a user, an output data structure is obtained. The output data structure includes pattern components sorted into output groups. At least one pattern component from at least one output group is selected based on the output mode and provided in the output to the user.

36 Claims, 17 Drawing Sheets

(58) Field of Classification Search
CPC ... G10L 15/1822; G10L 15/183; G10L 15/20;
G10L 15/221; G10L 15/24; G10L 15/26;
G10L 13/00; G10L 13/04; G10L 13/06;
G10L 2013/083; G10L 13/08; G10L
13/10; G10L 15/01; G10L 15/02; G10L
2015/086; G10L 2015/088; G10L
2015/221; G10L 15/222; G10L 2015/223;
G10L 2015/225; G10L 2015/226; G10L
2015/228; G10L 2015/227; G10L 15/25;
G10L 15/32; G10L 15/34; G10L 17/20;
G10L 17/22; G10L 25/54; G10L 25/69;
G10L 2025/786; G10L 2025/783; G10L
25/78; G06F 16/245; G06F 40/00; G06F
40/30; G06F 40/35; G06F 40/284; G06F
40/279; G06F 16/353; G06F 16/3344;
G06F 16/3338; G06F 16/3325; G06F
9/5083
USPC .... 704/270.1, 270, 275, 276, 257, 251, 243, 704/258
See application file for complete search history.

(56) References Cited

U.S. PATENT DOCUMENTS

| | | | |
|---|---|---|---|
| 7,809,550 B1 | 10/2010 | Barrows | |
| 7,809,570 B2 | 10/2010 | Kennewick et al. | |
| 7,813,822 B1* | 10/2010 | Hoffberg | H04N 7/163 381/73.1 |
| 8,594,935 B2* | 11/2013 | Cioffi | G01C 21/3629 701/533 |
| 8,600,930 B2 | 12/2013 | Sata et al. | |
| 8,638,363 B2 | 1/2014 | King et al. | |
| 8,676,273 B1 | 3/2014 | Fujisaki | |
| 8,689,135 B2 | 4/2014 | Portele et al. | |
| 8,862,252 B2 | 10/2014 | Rottler et al. | |
| 8,886,462 B1* | 11/2014 | Cioffi | G01C 21/3863 701/533 |
| 8,977,255 B2 | 3/2015 | Freeman et al. | |
| 9,002,714 B2 | 4/2015 | Kim et al. | |
| 9,043,211 B2 | 5/2015 | Haiut et al. | |
| 9,070,247 B2 | 6/2015 | Kuhn et al. | |
| 9,405,741 B1 | 8/2016 | Schaaf et al. | |
| 9,432,499 B2 | 8/2016 | Hajdu et al. | |
| 9,658,746 B2 | 5/2017 | Cohn et al. | |
| 9,690,542 B2 | 6/2017 | Reddy et al. | |
| 9,697,822 B1 | 7/2017 | Naik et al. | |
| 9,823,811 B2 | 11/2017 | Brown et al. | |
| 9,886,953 B2 | 2/2018 | Lemay et al. | |
| 10,185,542 B2 | 1/2019 | Carson et al. | |
| 10,192,552 B2 | 1/2019 | Raitio et al. | |
| 10,296,160 B2 | 5/2019 | Shah et al. | |
| 10,332,513 B1 | 6/2019 | D'souza et al. | |
| 10,356,243 B2 | 7/2019 | Sanghavi et al. | |
| 10,360,300 B2* | 7/2019 | Sarikaya | G10L 15/063 |
| 10,417,037 B2 | 9/2019 | Gruber et al. | |
| 10,684,703 B2 | 6/2020 | Hindi et al. | |
| 10,791,176 B2 | 9/2020 | Phipps et al. | |
| 10,959,090 B1* | 3/2021 | Paiz | H04L 63/04 |
| 11,009,970 B2 | 5/2021 | Hindi et al. | |
| 11,119,985 B1* | 9/2021 | Alagianambi | G06F 9/541 |
| 11,551,663 B1* | 1/2023 | Bissell | G06F 3/167 |
| 2006/0085183 A1 | 4/2006 | Jain | |
| 2009/0007188 A1 | 1/2009 | Omernick | |
| 2009/0098903 A1 | 4/2009 | Donaldson et al. | |
| 2009/0125299 A1 | 5/2009 | Wang | |
| 2009/0150480 A1* | 6/2009 | Xia | H04L 67/02 709/203 |
| 2009/0228842 A1 | 9/2009 | Westerman et al. | |
| 2009/0290718 A1 | 11/2009 | Kahn et al. | |
| 2009/0318198 A1 | 12/2009 | Carroll | |
| 2010/0013796 A1 | 1/2010 | Abileah et al. | |
| 2010/0138680 A1 | 6/2010 | Brisebois et al. | |
| 2010/0240403 A1* | 9/2010 | Yu | H04W 4/12 455/466 |
| 2010/0241350 A1* | 9/2010 | Cioffi | G01C 21/3629 704/E21.001 |
| 2010/0286985 A1 | 11/2010 | Kennewick et al. | |
| 2011/0166862 A1 | 7/2011 | Eshed et al. | |
| 2011/0223893 A1 | 9/2011 | Lau et al. | |
| 2011/0231432 A1 | 9/2011 | Sata et al. | |
| 2011/0283189 A1 | 11/2011 | McCarty | |
| 2012/0016678 A1 | 1/2012 | Gruber et al. | |
| 2012/0022872 A1 | 1/2012 | Gruber et al. | |
| 2012/0041752 A1 | 2/2012 | Wang et al. | |
| 2012/0065972 A1 | 3/2012 | Strifler et al. | |
| 2012/0173464 A1 | 7/2012 | Tur et al. | |
| 2012/0209454 A1 | 8/2012 | Miller et al. | |
| 2012/0245944 A1 | 9/2012 | Gruber et al. | |
| 2013/0033643 A1 | 2/2013 | Kim et al. | |
| 2013/0078930 A1 | 3/2013 | Chen et al. | |
| 2013/0080167 A1 | 3/2013 | Mozer | |
| 2013/0130669 A1 | 5/2013 | Xiao et al. | |
| 2013/0185074 A1 | 7/2013 | Gruber et al. | |
| 2013/0207898 A1 | 8/2013 | Sullivan et al. | |
| 2013/0210410 A1 | 8/2013 | Xu | |
| 2013/0275875 A1 | 10/2013 | Gruber et al. | |
| 2013/0347102 A1 | 12/2013 | Shi | |
| 2014/0074454 A1 | 3/2014 | Brown et al. | |
| 2014/0074483 A1 | 3/2014 | Van Os | |
| 2014/0195252 A1 | 7/2014 | Gruber et al. | |
| 2014/0218372 A1 | 8/2014 | Missig et al. | |
| 2014/0272821 A1 | 9/2014 | Pitschel et al. | |
| 2014/0278443 A1 | 9/2014 | Gunn et al. | |
| 2014/0317030 A1 | 10/2014 | Shen et al. | |
| 2014/0317502 A1 | 10/2014 | Brown et al. | |
| 2014/0324341 A1* | 10/2014 | Cioffi | A61H 3/061 701/533 |
| 2014/0342762 A1 | 11/2014 | Hajdu et al. | |
| 2015/0053779 A1 | 2/2015 | Adamek et al. | |
| 2015/0106093 A1 | 4/2015 | Weeks et al. | |
| 2015/0161521 A1 | 6/2015 | Shah et al. | |
| 2015/0186154 A1 | 7/2015 | Brown et al. | |
| 2015/0234556 A1 | 8/2015 | Shaofeng et al. | |
| 2015/0261298 A1 | 9/2015 | Li | |
| 2015/0339391 A1 | 11/2015 | Kang et al. | |
| 2015/0371663 A1 | 12/2015 | Gustafson et al. | |
| 2015/0373183 A1 | 12/2015 | Woolsey et al. | |
| 2016/0112792 A1 | 4/2016 | Lee et al. | |
| 2016/0179464 A1 | 6/2016 | Reddy et al. | |
| 2016/0259623 A1 | 9/2016 | Sumner et al. | |
| 2016/0260436 A1 | 9/2016 | Lemay et al. | |
| 2016/0308799 A1 | 10/2016 | Schubert et al. | |
| 2016/0328147 A1 | 11/2016 | Zhang et al. | |
| 2016/0342685 A1 | 11/2016 | Basu et al. | |
| 2017/0006329 A1 | 1/2017 | Jang et al. | |
| 2017/0131778 A1 | 5/2017 | Iyer | |
| 2017/0132199 A1 | 5/2017 | Vescovi et al. | |
| 2017/0147841 A1 | 5/2017 | Stagg et al. | |
| 2017/0161018 A1 | 6/2017 | Lemay et al. | |
| 2018/0024985 A1 | 1/2018 | Asano | |
| 2018/0091847 A1 | 3/2018 | Wu et al. | |
| 2018/0130470 A1 | 5/2018 | Lemay et al. | |
| 2018/0188948 A1 | 7/2018 | Ouyang et al. | |
| 2018/0336904 A1 | 11/2018 | Piercy et al. | |
| 2019/0095050 A1 | 3/2019 | Gruber et al. | |
| 2019/0220247 A1 | 7/2019 | Lemay et al. | |
| 2019/0294769 A1 | 9/2019 | Lesso | |
| 2020/0019609 A1 | 1/2020 | Yu et al. | |
| 2020/0098368 A1 | 3/2020 | Lemay et al. | |
| 2020/0135180 A1 | 4/2020 | Mukherjee et al. | |
| 2020/0168120 A1 | 5/2020 | Rodriguez Bravo | |
| 2020/0302925 A1 | 9/2020 | Shah et al. | |
| 2021/0110106 A1 | 4/2021 | Vescovi et al. | |
| 2021/0134318 A1 | 5/2021 | Harvey et al. | |
| 2021/0365161 A1 | 11/2021 | Ellis et al. | |

(56) References Cited

U.S. PATENT DOCUMENTS

| | | |
|---|---|---|
| 2021/0365174 A1 | 11/2021 | Ellis et al. |
| 2021/0366480 A1 | 11/2021 | Lemay et al. |

FOREIGN PATENT DOCUMENTS

| | | |
|---|---|---|
| CN | 102792320 A | 11/2012 |
| CN | 103959751 A | 7/2014 |
| CN | 104144377 A | 11/2014 |
| CN | 104240701 A | 12/2014 |
| CN | 104516522 A | 4/2015 |
| CN | 104951077 A | 9/2015 |
| CN | 106465074 A | 2/2017 |
| EP | 2555536 A1 | 2/2013 |
| EP | 2801974 A2 | 11/2014 |
| EP | 2985984 A2 | 2/2016 |
| EP | 3125097 A2 | 2/2017 |
| EP | 3227771 A1 | 10/2017 |
| EP | 3246916 A1 | 11/2017 |
| EP | 3392876 A1 | 10/2018 |
| JP | 2012-147063 A | 8/2012 |
| JP | 2013-517566 A | 5/2013 |
| JP | 2014-222514 A | 11/2014 |
| JP | 2015-501022 A | 1/2015 |
| JP | 2015-514254 A | 5/2015 |
| JP | 2016-151928 A | 8/2016 |
| KR | 10-2012-0120316 A | 11/2012 |
| KR | 10-2014-0055204 A | 5/2014 |
| KR | 10-2017-0036805 A | 4/2017 |
| KR | 10-2017-0107058 A | 9/2017 |
| KR | 10-2018-0032632 A | 3/2018 |
| KR | 10-2018-0135877 A | 12/2018 |
| WO | 2007/009225 A1 | 1/2007 |
| WO | 2011/028842 A2 | 3/2011 |
| WO | 2011/088053 A2 | 7/2011 |
| WO | 2013/022223 A2 | 2/2013 |
| WO | 2013/048880 A1 | 4/2013 |
| WO | 2013/163113 A1 | 10/2013 |
| WO | 2014/028797 A1 | 2/2014 |
| WO | 2014/040022 A2 | 3/2014 |
| WO | 2014/144395 A2 | 9/2014 |
| WO | 2014/173189 A1 | 10/2014 |
| WO | 2016/144840 A1 | 9/2016 |
| WO | 2016/144983 A1 | 9/2016 |
| WO | 2017/044160 A1 | 3/2017 |
| WO | 2017/044257 A1 | 3/2017 |
| WO | 2018/209152 A1 | 11/2018 |
| WO | 2018/213401 A1 | 11/2018 |

OTHER PUBLICATIONS

Graves, Alex, "Sequence Transduction with Recurrent Neural Networks", Proceeding of International Conference of Machine Learning (ICML) Representation Learning Workshop, Nov. 14, 2012, 9 pages.

Xu et al., "Speech-Based Interactive Games for Language Learning: Reading, Translation, and Question-Answering", Computational Linguistics and Chinese Language Processing, vol. 14, No. 2, Jun. 2009, pp. 133-160.

* cited by examiner

| OUTPUT GROUP 810 | AUDIO COMPONENT 820 | FULL AUDIO | SUPPORTING AUDIO | VISUAL COMPONENT 830 | FULL VISUAL | SUPPORTING VISUAL |
|---|---|---|---|---|---|---|
| (A) 811 | INTRO 821 | ✓ | ✓ | HEADER 831 | ✓ | |
| (B) 813 | WINDOW INTRO 823 | ✓ | | SUBHEADER 833 | | ✓ |
| (C) 815 | LIST ITEM STATEMENT 825 | ✓ | | ITEM 835 | ✓ | ✓ |
| (D) 817 | CONTINUATION PROMPT 827 | ✓ | | BUTTON 837 | | ✓ |
| (E) 819 | CONCLUSION 829 | ✓ | | | | |

DIGITAL ASSISTANT RESPONSE FRAMEWORK

CROSS-REFERENCE TO RELATED APPLICATIONS

This application claims priority to U.S. Provisional Application No. 63/346,633, entitled "DIGITAL ASSISTANT RESPONSE FRAMEWORK," and filed May 27, 2022, the content of which is hereby incorporated by reference.

FIELD

This relates generally to intelligent automated assistants and, more specifically, to an intelligent automated assistant that delivers outputs formatted according to different output modes.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

An electronic device may provide an output to a user according to various output modes, for instance, displaying a visual output on a display and/or playing an audio output through a speaker or headphones. Being able to provide an output in multiple modes can create a more flexible user experience, where the format of the output can be tailored for different situations, for instance, displaying textual information on an electronic device placed in silent mode, or audibly conversing with a user through vehicle interface while the user drives. However, electronic devices may produce many different outputs for many different use cases (e.g., domains) across many different platforms (e.g., a mobile phone, a smart watch, a laptop, etc.), so tailoring every output to accommodate a visual, audio, or mixed output can be labor-intensive and inefficient, and can lead to a fragmented user experience, where the format of an output varies significantly across different domains, modes, and platforms.

SUMMARY

Example methods are disclosed herein. An example method includes, at an electronic device having one or more processors, selecting an output mode; in accordance with a determination that an output is to be provided by the electronic device, obtaining an output data structure for the output, wherein the output data structure includes one or more output groups, and wherein each output group includes one or more pattern components; selecting, based on the output mode, at least a first pattern component from at least a first output group of the output data structure to include in the output; and providing the output including at least the first pattern component of the output group.

Example non-transitory computer-readable media are disclosed herein. An example non-transitory computer-readable storage medium stores one or more programs. The one or more programs comprise instructions, which when executed by one or more processors of an electronic device, cause the electronic device to select an output mode; in accordance with a determination that an output is to be provided by the electronic device, obtain an output data structure for the output, wherein the output data structure includes one or more output groups, and wherein each output group includes one or more pattern components; select, based on the output mode, at least a first pattern component from at least a first output group of the output data structure to include in the output; and provide the output including at least the first pattern component of the output group.

Example electronic devices are disclosed herein. An example electronic device comprises one or more processors; a memory; and one or more programs, where the one or more programs are stored in the memory and configured to be executed by the one or more processors, the one or more programs including instructions for selecting an output mode; in accordance with a determination that an output is to be provided by the electronic device, obtaining an output data structure for the output, wherein the output data structure includes one or more output groups, and wherein each output group includes one or more pattern components; selecting, based on the output mode, at least a first pattern component from at least a first output group of the output data structure to include in the output; and providing the output including at least the first pattern component of the output group.

An example electronic device comprises means for selecting an output mode; in accordance with a determination that an output is to be provided by the electronic device, obtaining an output data structure for the output, wherein the output data structure includes one or more output groups, and wherein each output group includes one or more pattern components; selecting, based on the output mode, at least a first pattern component from at least a first output group of the output data structure to include in the output; and providing the output including at least the first pattern component of the output group.

Delivering a formatted output, as described herein, provides an intuitive and efficient approach for enabling different output modes for an electronic device. Using domain-independent output data structures as patterns provides an efficient way for information from a variety of domains to be formatted for output, without requiring each output domain (e.g., each possible task flow or function that may need to output information) to define and store output formats for each possible output mode (e.g., visual, audio, and mixed modes). Additionally, the output data structure improves the user experience by ensuring a more consistent, intuitive output format across different domains (e.g., different content and use cases).

BRIEF DESCRIPTION OF THE DRAWINGS

FIGS. 8A-8G illustrate systems for providing outputs to a user formatted based on an output mode, according to various examples.

DETAILED DESCRIPTION

In the following description of examples, reference is made to the accompanying drawings in which are shown by way of illustration specific examples that can be practiced. It is to be understood that other examples can be used and structural changes can be made without departing from the scope of the various examples.

An intelligent automated assistant may provide an output from an electronic device formatted according to a selected output mode. When providing an output, a content- and use case-agnostic output data structure for the output is obtained. The output data structure includes pattern components grouped into one or more output groups. Based on the output mode, different configurations of pattern components of the various output groups are selected to include in the output. The output is then provided to a user, for example, after populating the selected pattern components with the specific content of the output.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

Figure 1:
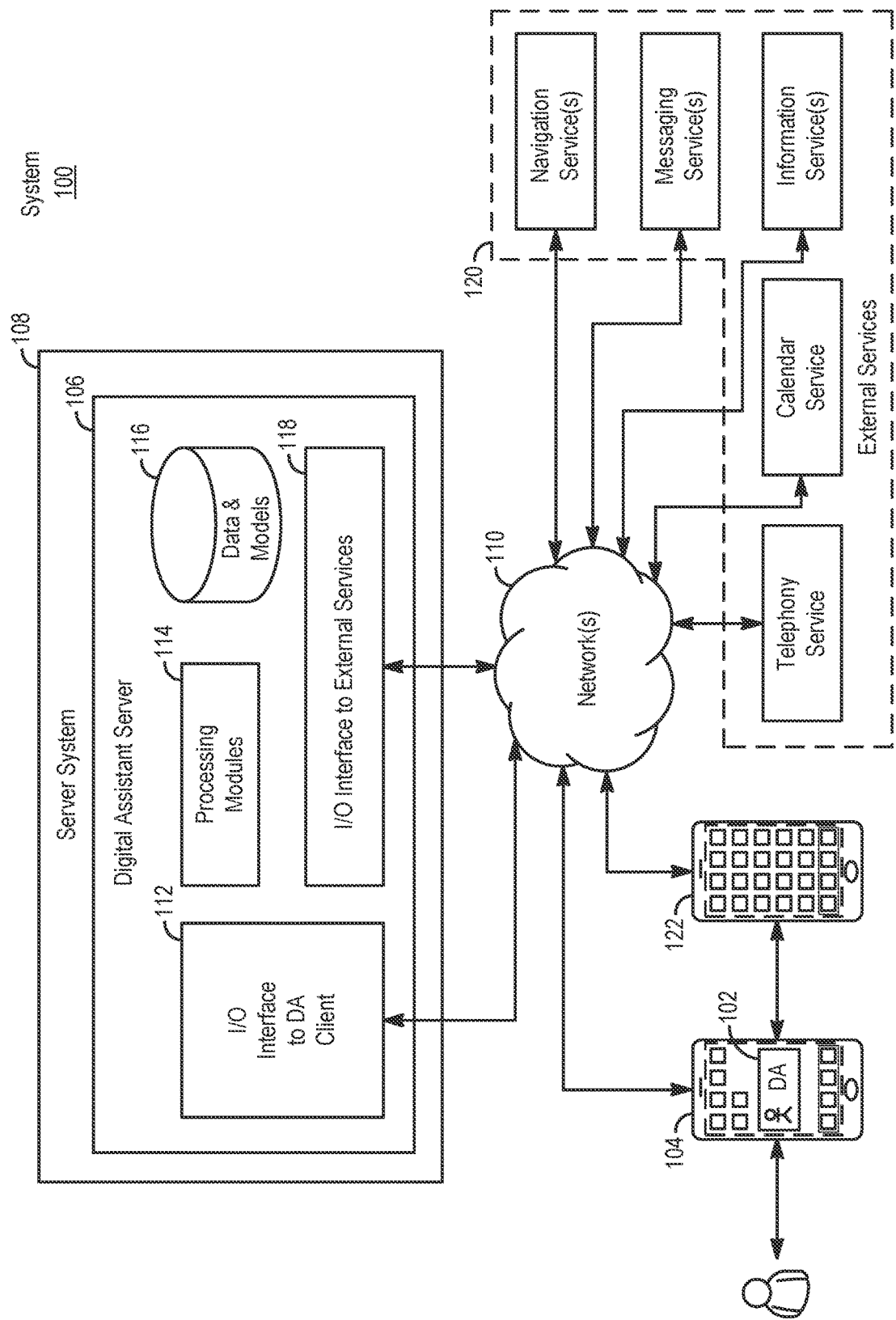
FIG. 1 is a block diagram illustrating a system and environment for implementing a digital assistant, according to various examples.

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server

106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4), or a personal electronic device (e.g., device 600, described below with reference to FIGS. 6A-6B). A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, California. Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-6B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
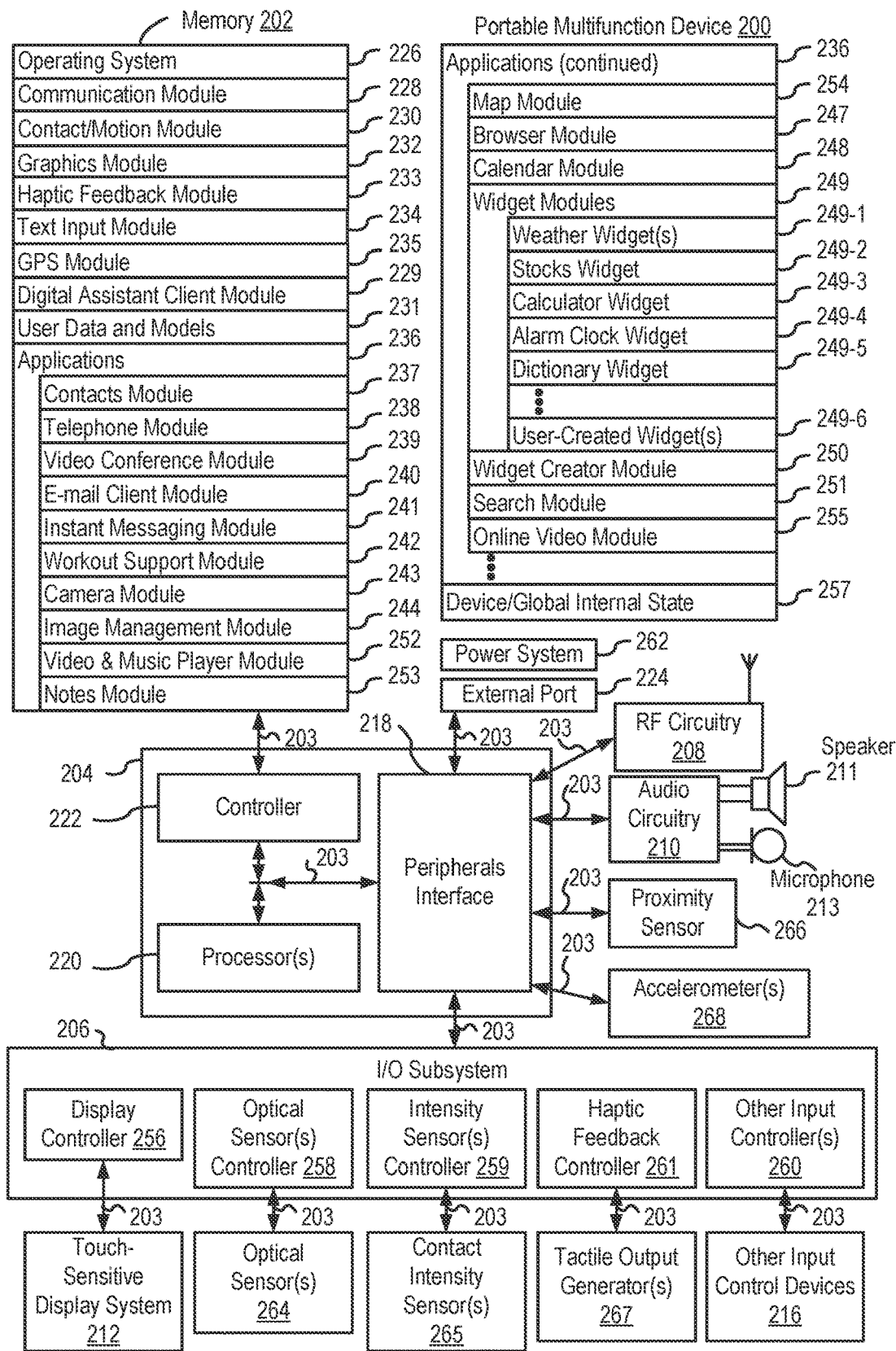
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, California.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6)

U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
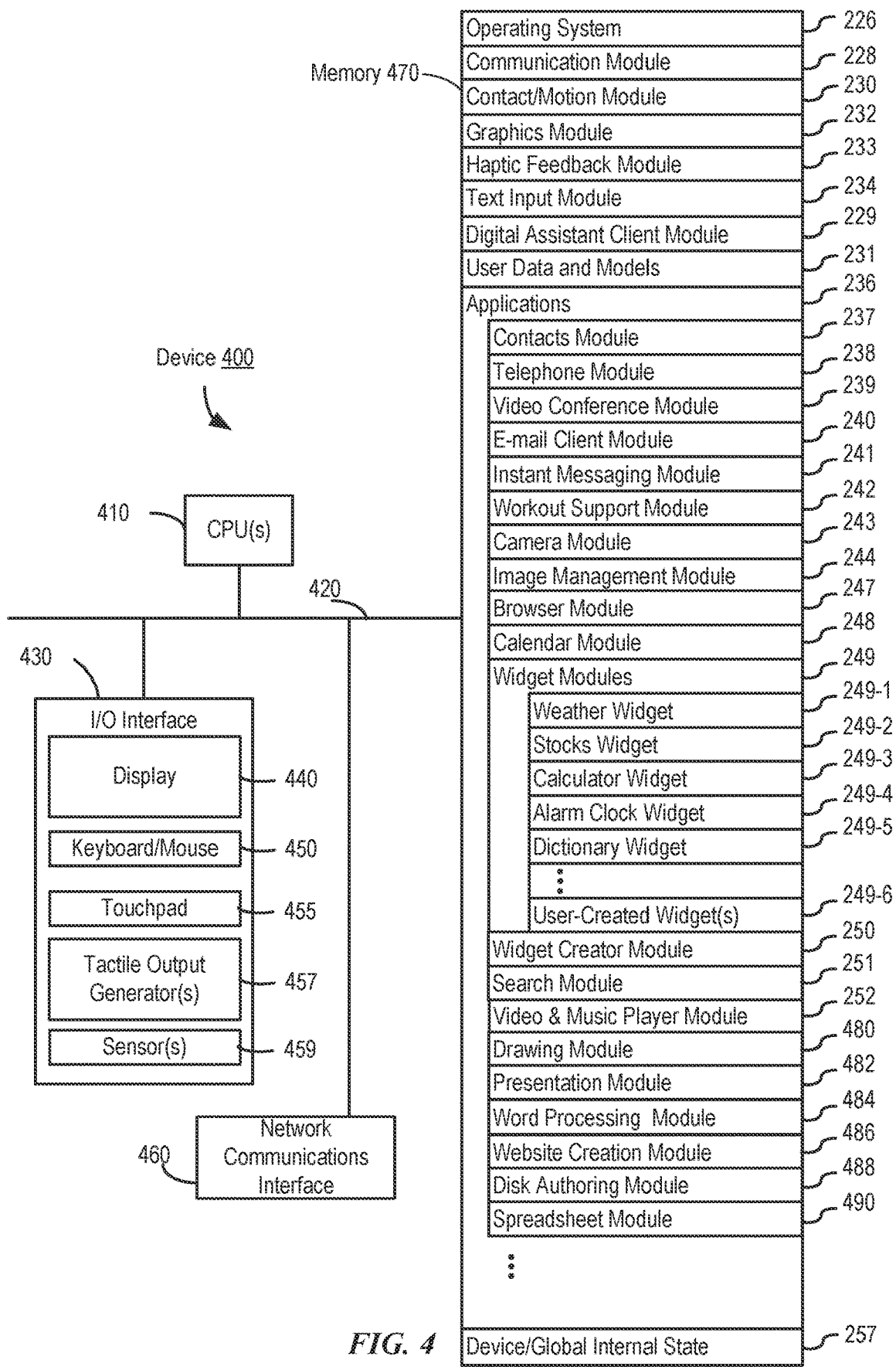
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts).

In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts 237, e-mail client module 240, IM 241, browser 247, and any other application that needs text input).

GPS module 235 determines the location of the device and provides this information for use in various applications (e.g., to telephone module 238 for use in location-based dialing; to camera module 243 as picture/video metadata;

and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-7C. It should be recognized that digital assistant client module 229 can include any number of the sub-modules of digital assistant module 726 described below.

Applications 236 include the following modules (or sets of instructions), or a subset or superset thereof:
Contacts module 237 (sometimes called an address book or contact list);
Telephone module 238;
Video conference module 239;
E-mail client module 240;
Instant messaging (IM) module 241;
Workout support module 242;
Camera module 243 for still and/or video images;
Image management module 244;
Video player module;
Music player module;
Browser module 247;
Calendar module 248;
Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
Widget creator module 250 for making user-created widgets 249-6;
Search module 251;
Video and music player module 252, which merges video player module and music player module;
Notes module 253;
Map module 254; and/or
Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
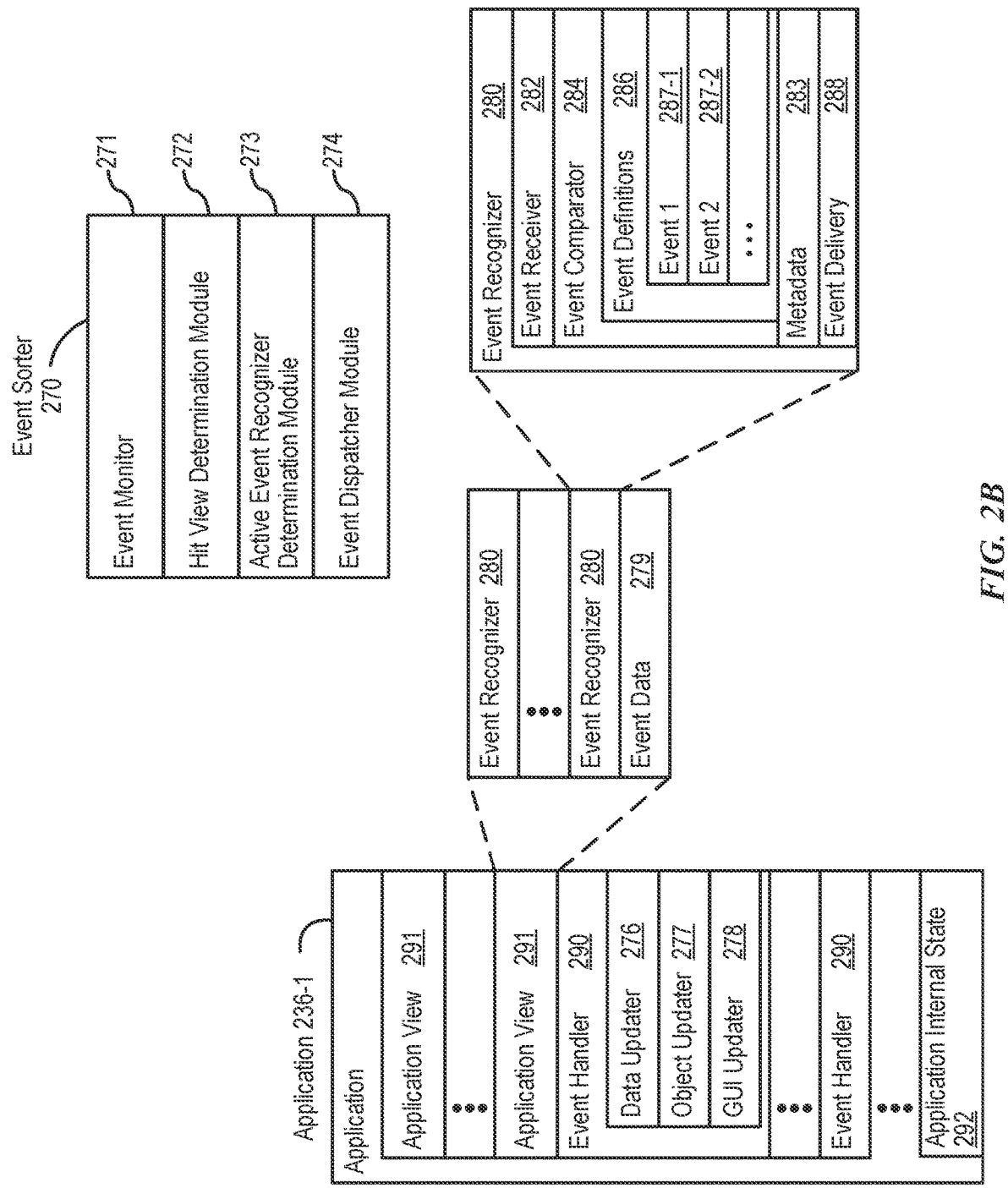
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
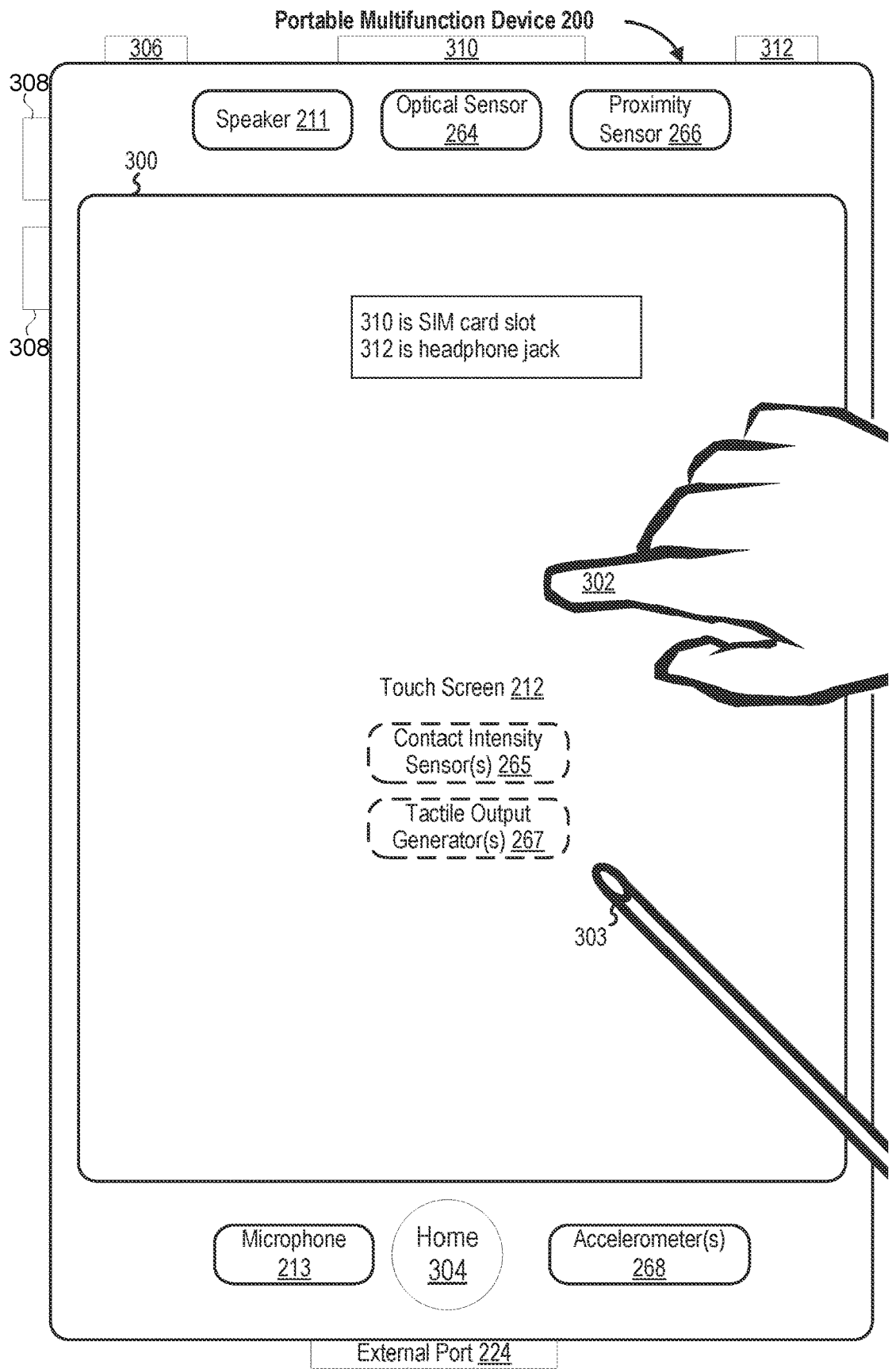
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
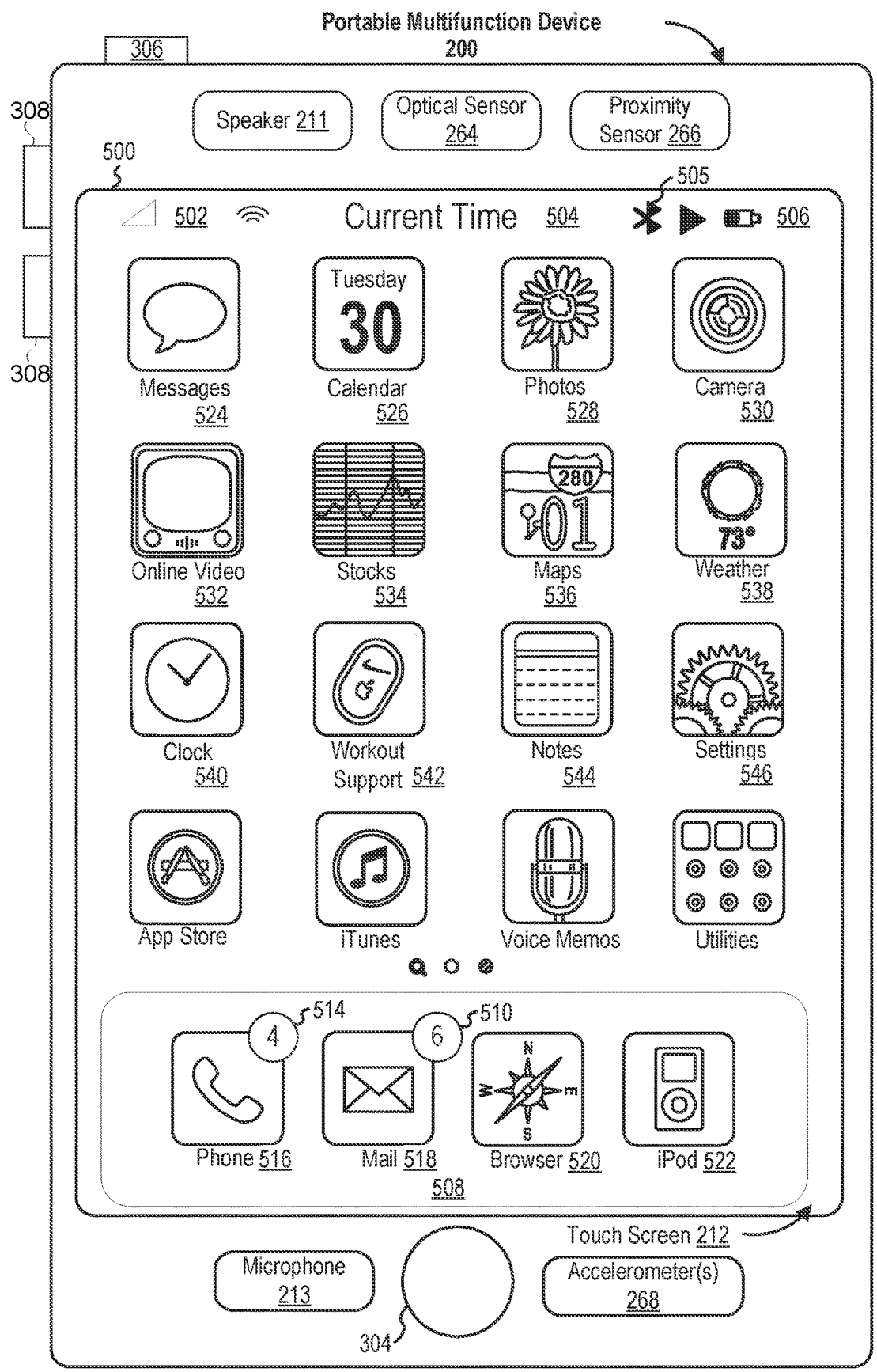
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

Signal strength indicator(s) 502 for wireless communication(s), such as cellular and Wi-Fi signals;
Time 504;
Bluetooth indicator 505;
Battery status indicator 506;
Tray 508 with icons for frequently used applications, such as:
  Icon 516 for telephone module 238, labeled "Phone," which optionally includes an indicator 514 of the number of missed calls or voicemail messages;
  Icon 518 for e-mail client module 240, labeled "Mail," which optionally includes an indicator 510 of the number of unread e-mails;
  Icon 520 for browser module 247, labeled "Browser;" and
  Icon 522 for video and music player module 252, also referred to as iPod (trademark of Apple Inc.) module 252, labeled "iPod;" and
Icons for other applications, such as:
  Icon 524 for IM module 241, labeled "Messages;"
  Icon 526 for calendar module 248, labeled "Calendar;"
  Icon 528 for image management module 244, labeled "Photos;"
  Icon 530 for camera module 243, labeled "Camera;"
  Icon 532 for online video module 255, labeled "Online Video;"
  Icon 534 for stocks widget 249-2, labeled "Stocks;"
  Icon 536 for map module 254, labeled "Maps;"
  Icon 538 for weather widget 249-1, labeled "Weather;"
  Icon 540 for alarm clock widget 249-4, labeled "Clock;"
  Icon 542 for workout support module 242, labeled "Workout Support;"
  Icon 544 for notes module 253, labeled "Notes;" and
  Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
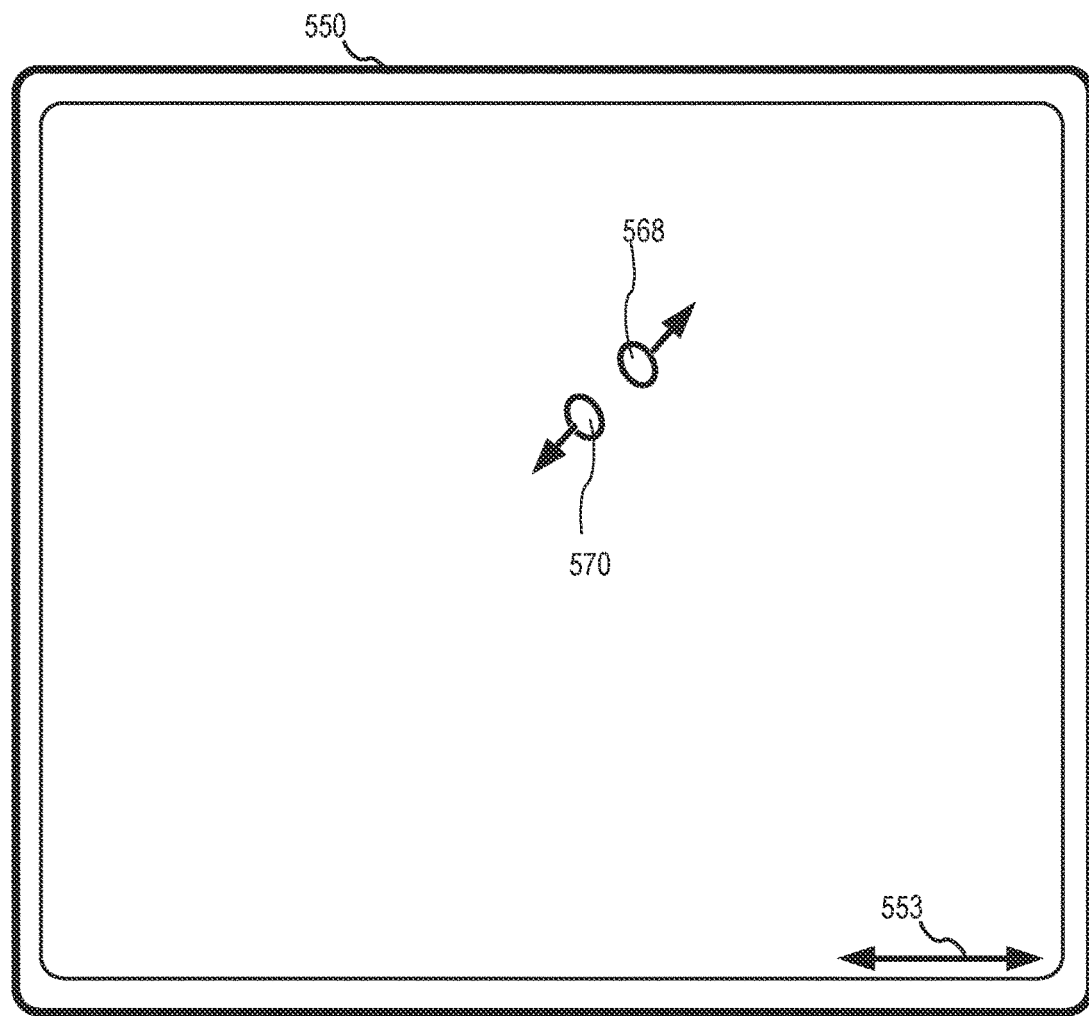
FIG. 5B illustrates an exemplary user interface for a multifunction device with a touch-sensitive surface that is separate from the display, according to various examples.
Figure 5B:
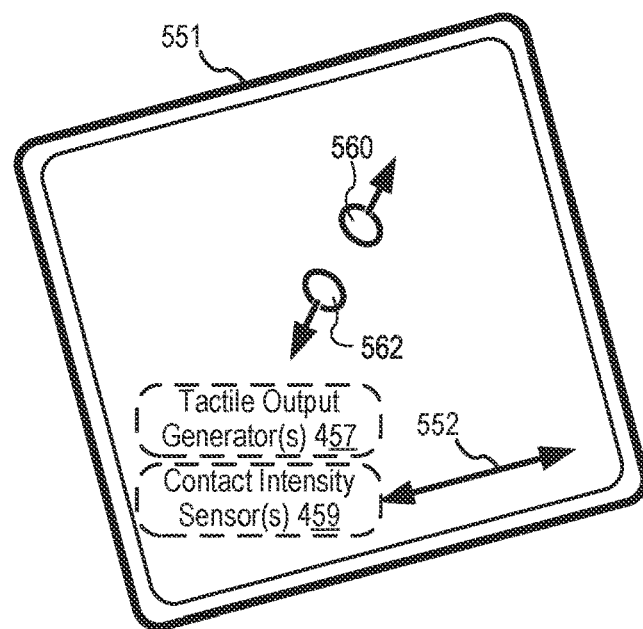

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 459) for detecting intensity of contacts on touch-sensitive surface 551 and/or one or more tactile output generators 457 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
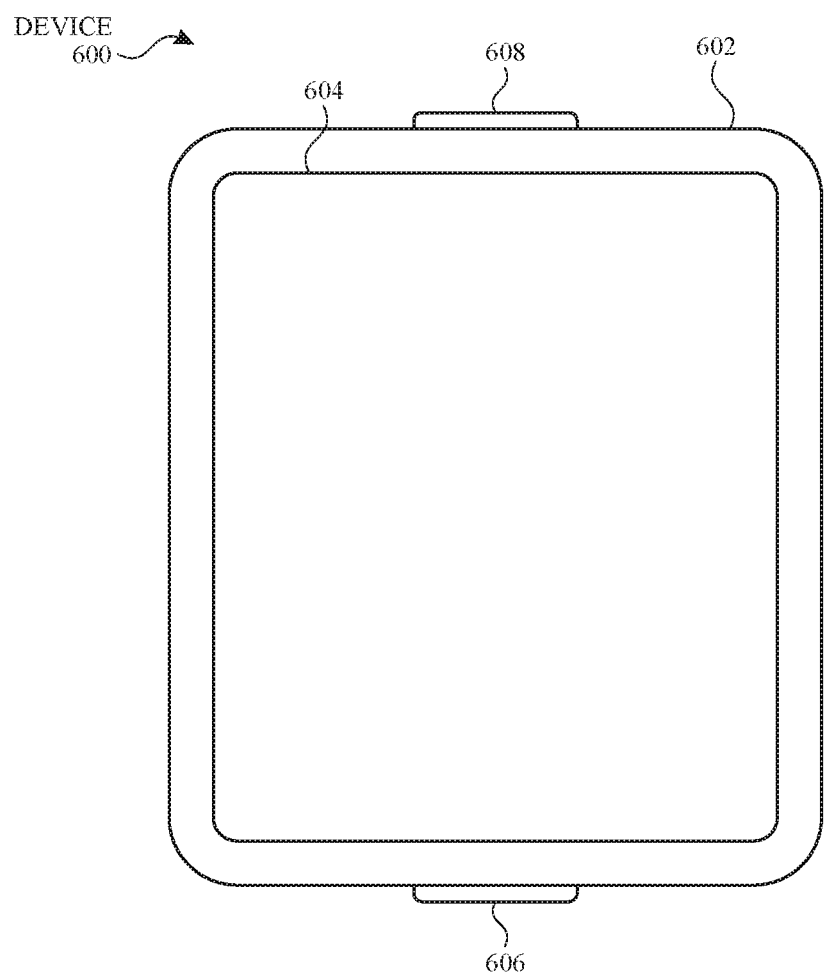
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
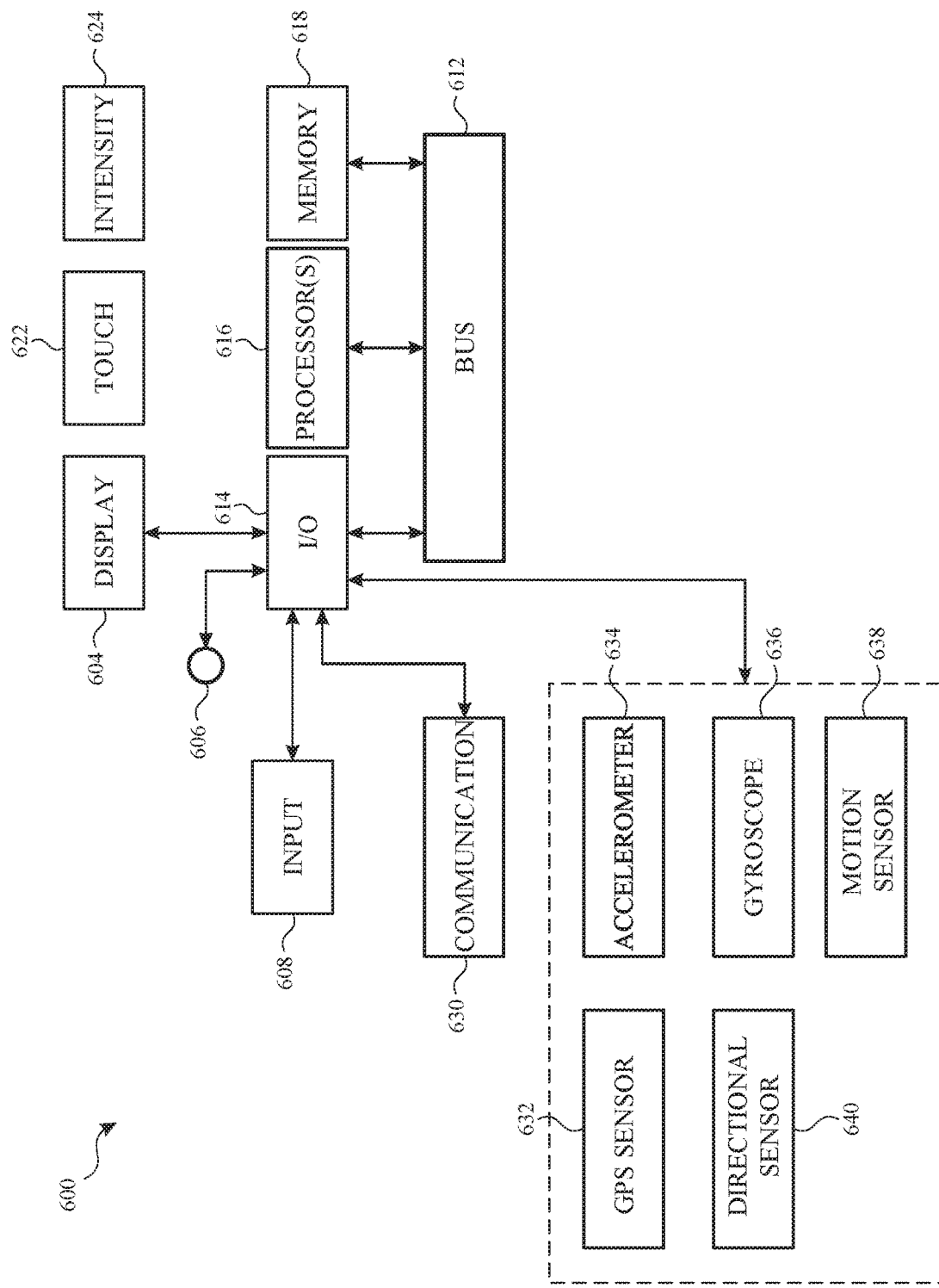
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, and/or 600 (FIGS. 2A, 4, and 6A-6B). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
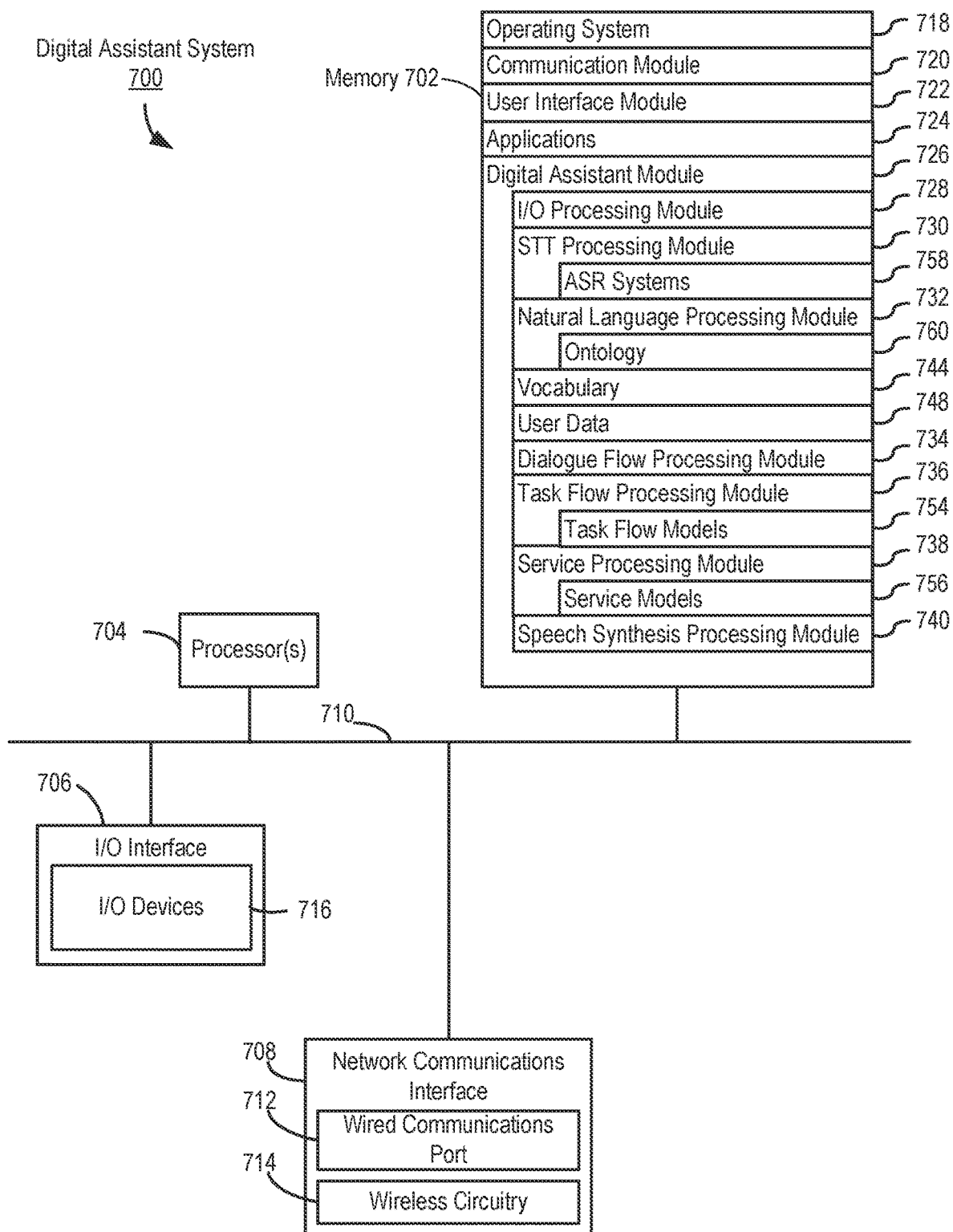
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, or 600 in FIGS. 2A, 4, 6A-6B, respectively. In some examples, digital assistant system 700 represents the server portion of a digital assistant implementation, and can interact with the user through a client-side portion residing on a user device (e.g., devices 104, 200, 400, or 600).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIGS. 2A, 4, 6A-6B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following sub-modules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
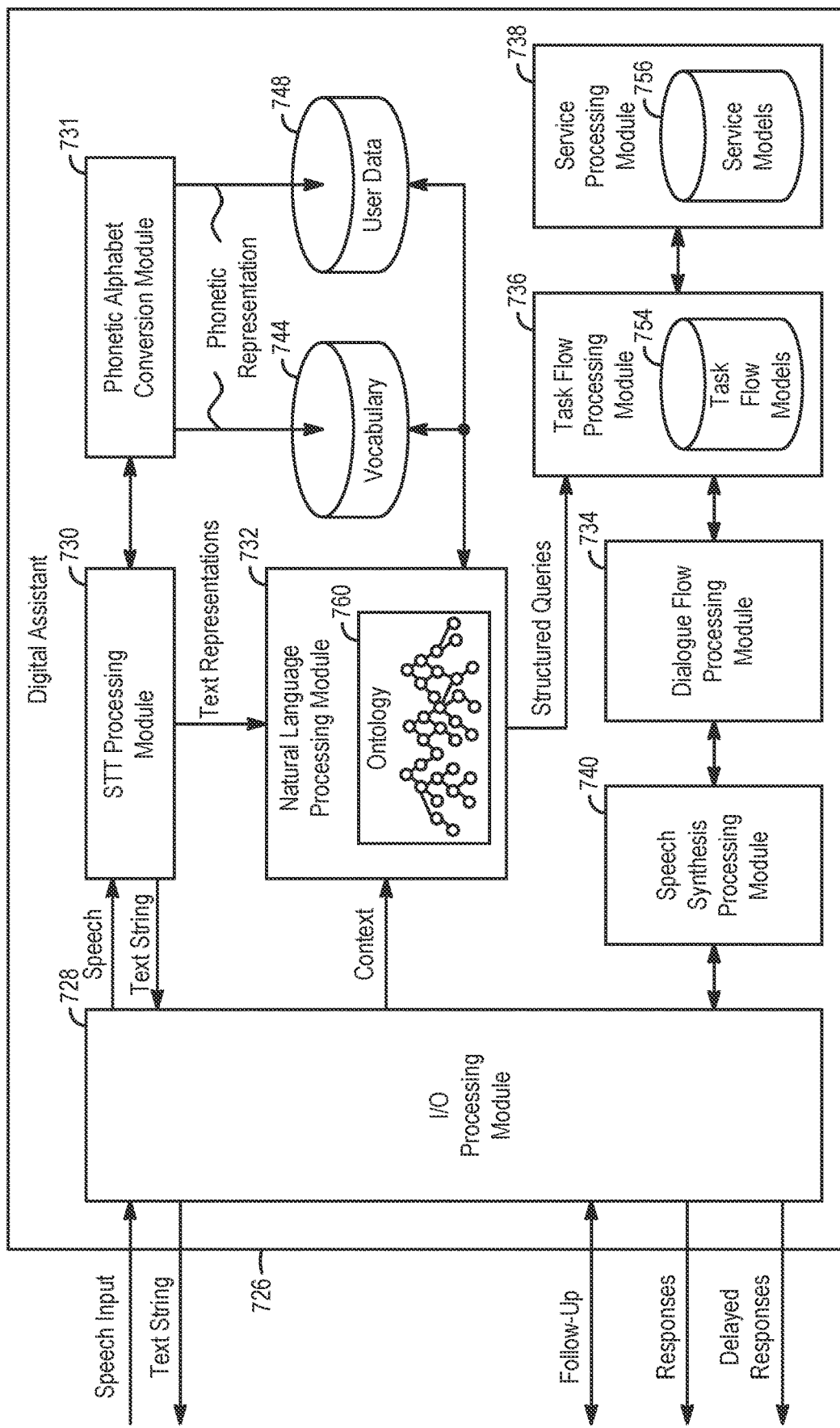
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /təˈmeɪroʊ/ and /təˈmɑtoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /təˈmeɪroʊ/ is ranked higher than /təˈmɑtoʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity.

For example, the candidate pronunciation tə'meɪɾoʊ is associated with the United States, whereas the candidate pronunciation tə'mɑtoʊ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation tə'meɪɾoʊ (associated with the United States) is ranked higher than the candidate pronunciation tə'mɑtoʊ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes tə'meɪɾoʊ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes tə'meɪɾoʊ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
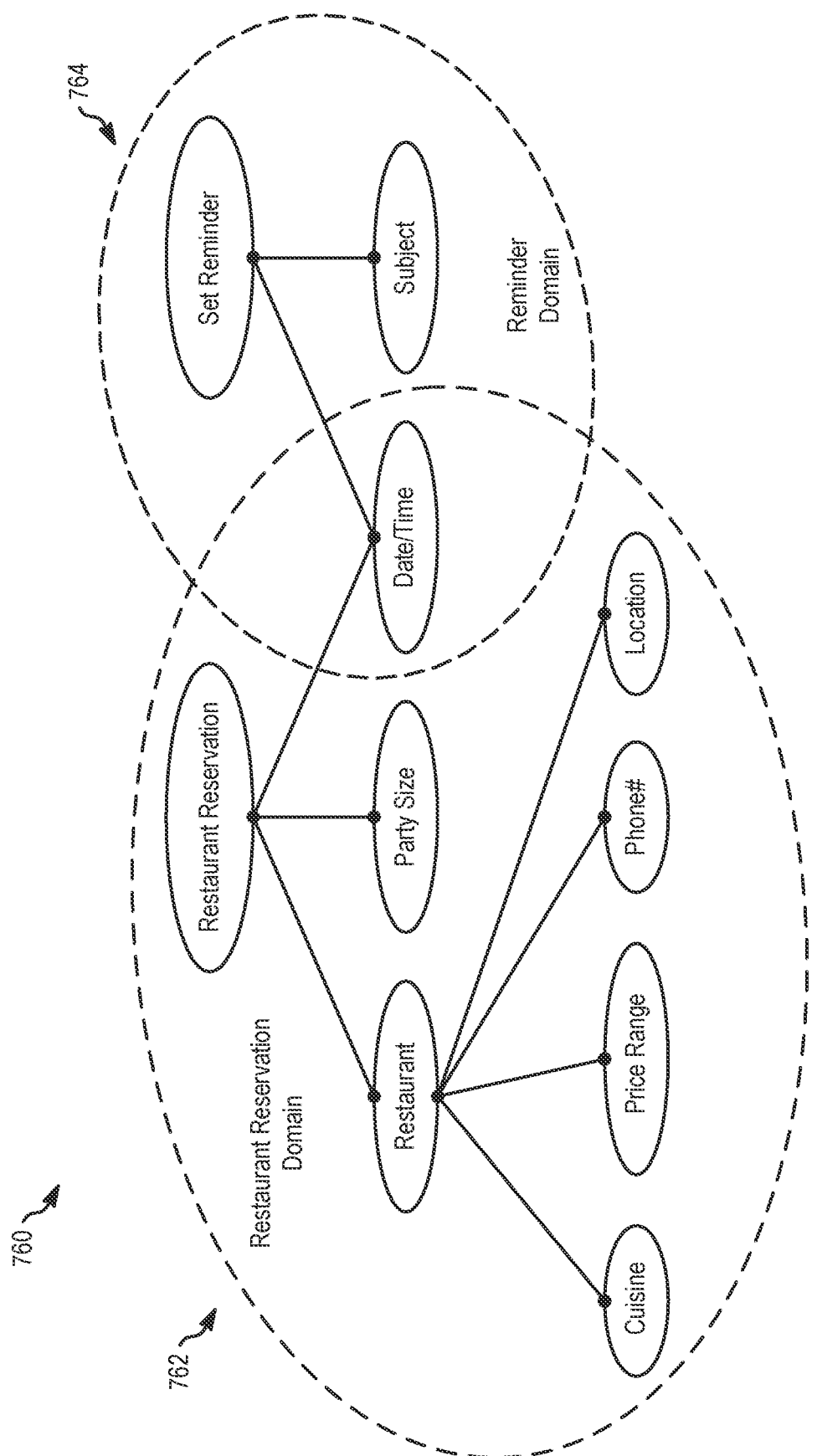
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Process for Providing an Output Formatted Based on an Output Mode

FIG. 8A illustrates system 800 for providing outputs to a user formatted based on an output mode in accordance with some embodiments. System 800 may be implemented, for example, using one or more electronic devices implementing a digital assistant (e.g., digital assistant system 700). In some embodiments, system 800 is implemented using a client-server system (e.g., system 100), and the functions of system 800 are divided up in any manner between one or more server devices (e.g., DA server 106) and a client device. In other embodiments, the functions of system 800 are divided up between one or more servers and multiple client devices (e.g., a mobile phone and a smart watch). Thus, while some functions of system 800 are described herein as being performed by particular devices of a client-server system, it will be appreciated that system 800 is not so limited. In other examples, system 800 is implemented using only a client device (e.g., user device 104) or only multiple client devices. In system 800, some functions are, optionally, combined, the order of some functions is, optionally, changed, and some functions are, optionally, omitted. In some examples, additional functions may be performed in combination with the described functions of system 800.

System 800 may be implemented using hardware, software, or a combination of hardware and software to carry out the principles discussed herein. Further, system 800 is exemplary, and thus system 800 can have more or fewer components than shown, can combine two or more components, or can have a different configuration or arrangement of the components. Further, although the below discussion describes functions being performed at a single component of system 800, it is to be understood that such functions can be performed at other components of system 800 and that such functions can be performed at more than one component of system 800. System 800 may be used to implement method 900 as described with respect to FIG. 9, below.

Referring to FIG. 8A, in response to determining that system 800 is to provide an output to a user of an electronic device (e.g., device 104), system 800 obtains output data structure 802. For example, an output provided by system 800 may include a result (e.g., of a task or query from a user), a status (e.g., success, failure, or pending status), or a request for clarification (e.g., a query to the user).

In some embodiments, the output to be provided by system 800 is a digital assistant output (e.g., a response generated using digital assistant system 700, described above). For example, an electronic device implementing system 800 receives a user input requesting a grocery list, such as a spoken user input ("Hey Siri, what's on my grocery list?"), a touch input on a touch-sensitive surface (e.g., a tap selecting a "Show Grocery List" suggestion affordance), or the like. Accordingly, when the digital assistant retrieves the requested grocery list, system 800 determines that an output including the grocery list is to be provided to the user, and obtains output data structure 802.

Output data structure 802 is used to format an output according to various output modes. For example, the contents of the grocery list retrieved by the digital assistant can be delivered to the user audibly (e.g., read aloud as dialog from the digital assistant), visually (e.g., displayed on a display of an electronic device), or in a mixed mode (e.g., using both audio and visual outputs). Output data structure 802 acts as a pattern to format the contents of the grocery list for audible, visual, or mixed-mode delivery.

As illustrated in FIG. 8A, output data structure 802 represents a pattern for a result set output, where multiple items of information are presented to a user as a set. For example, output data structure 802 can be used to output result sets such as a grocery list, a packing list, a to-do list, or another list created by a user and retrieved by a digital assistant. As another example, output data structure 802 can be used to deliver the results of other digital assistant tasks such as a news briefing (e.g., a result set of news briefing items), a search (e.g., a result set of search results), or the like. As output data structure 802 can be applied to format an output for many different results, regardless of the domain of the use case (e.g., list retrieval vs. news briefing) or content (e.g., grocery items vs. to-do items), output data structure 802 is considered domain independent.

In some embodiments, output data structure 802 is selected from a set of output data structures. For example, the set of output data structures may include result patterns (e.g., simple result, detailed result, result set, multi-level result set, table set, and variable result set), status patterns (e.g., success status, error status, cancelled status, and progress status), and clarification patterns (e.g., yes/no clarification, open-ended clarification, simple disambiguation clarification, and detailed disambiguation clarification). As output data structures included in the set are, like output data structure 802, domain independent, the set can be relatively small in size while being applicable to format most outputs, including outputs from numerous digital assistant and electronic device tasks (e.g., use cases). For example, the simple result data structure may be used to format digital assistant responses to requests such as "When is Memorial Day," "How deep is Lake Michigan," "Who directed CODA," and so forth. As another example, the open-ended clarification data structure may be used to format follow-up requests from a digital assistant, such as "What day would you like to make a reservation for?," "What music do you want to play?," "When should I set an alarm for?," and the like.

In some embodiments, output data structure 802 is selected from the set of output data structures based on a task flow. For example, in response to receiving a user input requesting a grocery list (e.g., "Hey Siri, what's on my grocery list?"), a digital assistant may initiate a task flow for retrieving and providing the grocery list. The digital assistant task flow may indicate that a result set pattern should be used to output the grocery list.

Output data structure 802 includes pattern components for the result set output. The pattern components represent domain-independent "building blocks" that can be assembled in various configurations to generate a formatted output. In some embodiments, the pattern components include audio pattern components 820. For example, intro 821, window intro 823, list item statement 825, continuation prompt 827, and conclusion 829 may include templates to format one or more lines of dialog (e.g., synthesized speech of a digital assistant) included in an audio or mixed-mode output. In some embodiments, the pattern components include visual pattern components 830. For example, header 831, subheader 833, item 835, and button 837 may include templates to format one or more display elements (e.g., text, images, affordances, or the like) included in a visual or mixed-mode output. In some embodiments, the visual pattern components include multiple versions of a template, each corresponding to a different device type (e.g., a mobile phone, smart watch, smart glasses, television, laptop, or the like), in order to format the display elements for that device type's display specifications.

The pattern components of output data structure 802 are organized into output groups 810. In some embodiments, output groups 810 represent groups of pattern components that serve equivalent or similar roles in conveying an output, including pattern components for different modes of output (e.g., audio vs. visual). For example, output group 811 includes an audio pattern component, intro 821, and a visual pattern component, header 831, that both serve to initially contextualize the output. As another example, output group 815 includes an audio pattern component, list item statement 825, and a visual pattern component, item 835, that both serve to deliver the contents of a result set (e.g., the list items). In some embodiments, some of output groups 810 do not include pattern components for all modes of output. For example, output group 819 includes the audio pattern component conclusion 829, but does not include an equivalent visual pattern component.

In some embodiments, some of output groups 810 are required, such that at least one pattern component from the required output group must be included in a proper output. For instance, at least one of intro 821 and header 831 from output group 811 and at least one of list item statement 825 and item 835 from output group 815 must be included in a proper result set output. In some embodiments, some of output groups 810 are optional. For example, not all result set outputs will include pattern components from output group 813, output group 817, or output group 819.

In some embodiments, output data structure 802 includes one or more input data fields for one or more sets of output data received from a task flow (e.g., a digital assistant task flow). As noted above, output data structure 802 is domain independent, so the task flow provides the actual domain-specific (e.g., use case and content-specific) output data. For example, the digital assistant task flow for retrieving a list may pass a title (e.g., "Shopping List") and list items (e.g., eggs, apples, butter, bread, cream cheese, maple syrup, tomatoes, and mushrooms) of the retrieved grocery list to output data structure 802.

In some embodiments, the one or more input data fields correspond to one or more of output groups 810. As noted above, output groups 810 represent groups of pattern components that serve equivalent or similar roles in conveying an output; therefore, when output data structure 802 receives a set of output data corresponding to a particular output group, the set of output data can be efficiently used to populate any of the pattern components included in the particular output group. For example, a task flow can pass unformatted, mode-independent output data to output data structure 802 (e.g., the list items), rather than formatted, mode-specific data (e.g., a set of list items formatted for audio output and/or a set of list items formatted for visual output).

FIGS. 8B-8G illustrate outputs (e.g., 842A, 842B, 842C, and 842D) generated by system 800 using output data structure 802. For example, outputs 842A, 842B, 842C, and 842D may be result outputs for a digital assistant task flow for retrieving a list, where the result of the task flow is a grocery list including grocery list items eggs, apples, butter, bread, cream cheese, maple syrup, tomatoes, and mushrooms.

The outputs illustrated in FIGS. 8B-8G (e.g., 842A, 842B, 842C, and 842D) are formatted according to various output modes. In some embodiments, output modes include modes of varying degrees of audio output and visual output used to convey the contents of a response (e.g., a digital assistant response). For example, the output modes may include an audio-only mode, where content is only delivered audibly; an audio-forward mode, where full audible content is delivered to the user along with supporting visual content; a visual-forward mode, where full visual content is delivered to the user along with supporting audible content; and a visual-only mode (e.g., silent mode), where content is only delivered visually.

Output data structure 802 thus defines configurations of pattern components to be included in an output of each of the various output modes (e.g., visual-only, visual-forward, audio-forward, and audio-only). For example, referring momentarily to FIG. 8A, output data structure 802 defines which pattern components of a given output group are toggled "on" or "off" for a particular degree (e.g., full vs. supporting) of audio or visual output.

System 800 delivers the output using device 840. In some embodiments, device 840 is capable of delivering both audio pattern components 820 and visual pattern components 830. For example, as illustrated in FIGS. 8B-8G, device 840 is a mobile phone with both a built-in display and a built-in speaker, which can be used to deliver outputs in any of the various output modes (e.g., audio-only, audio-forward, visual-forward, or visual-only). In some embodiments, the delivery of audio pattern components 820 and visual pattern components 830 may be distributed across multiple devices, such as delivering audio pattern components 820 using headphones or a smart speaker or delivering visual pattern components 830 using an external monitor or a television. In some embodiments, the delivery of audio pattern components 820 includes synthesizing speech to output lines of dialog, for instance, using a digital assistant of device 840 (e.g., digital assistant system 700).

In some embodiments, system 800 selects the output mode by determining a degree of visual output (e.g., full visual or supporting visual) and a degree of audio output (e.g., full audio or supporting audio) appropriate for the output. In some embodiments, the degree of visual output may be determined relative to the degree of audio output (e.g., the greater the degree of visual output, the lesser the degree of audio output, and vice versa). For example, in the visual-forward mode, a full degree of visual output is provided with a supporting degree of audio output, and in the audio-forward mode, a full degree of audio output is provided with a supporting degree of visual output.

In some embodiments, system 800 selects the output mode based on context information associated with device 840, such as the type of the device or devices delivering the output, user attention context, device settings, and so forth. For example, if device setting context information indicates that the user has engaged a "silent" mode of device 840, a visual-only mode is appropriate to maintain silence. As another example, if the user attention context information indicates user is looking at a display of device 840 and wearing connected headphones connected to device 840, a display-forward mode is appropriate, as the user will be able to see the full visual content and hear the supporting audio content.

Figure 8B:
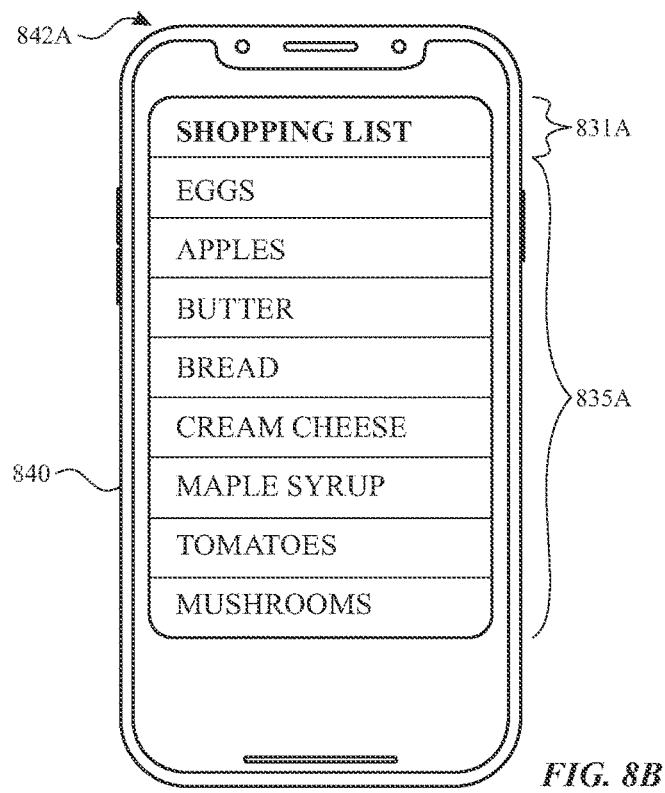

FIG. 8B illustrates delivering an output in a visual-only (e.g., silent) output mode according to output data structure 802. For example, the visual-only mode may have been selected based on context information indicating that the user is currently in a library and is interacting with the display of device 840. Referring momentarily to FIG. 8A, according to output data structure 802, a full degree of visual output includes the visual pattern components header 831 and item 835. Accordingly, output 842A includes header display element 831A (Shopping List) and item display element 835A (eggs, apples, butter, bread, cream cheese, maple syrup, tomatoes, mushrooms) displayed on the display of device 840. As the output mode is a visual-only (e.g., silent) mode, output 842A does not include any audio output components.

In some embodiments, the pattern components included in the output (e.g., header 831 and item 835) are populated with sets of output data corresponding to the respective output groups for the pattern components (e.g., output group 811 and output group 815, respectively) to generate output components for delivery (e.g., header display element 831A and item display element 835A, respectively). In some embodiments, the sets of data are received from a task flow (e.g., using one or more data input fields of output data structure 802). For example, as illustrated in FIG. 8B, item 835 is populated with the received grocery list items eggs, apples, butter, bread, cream cheese, maple syrup, tomatoes, and mushrooms to generate item display element 835A.

Figure 8C:
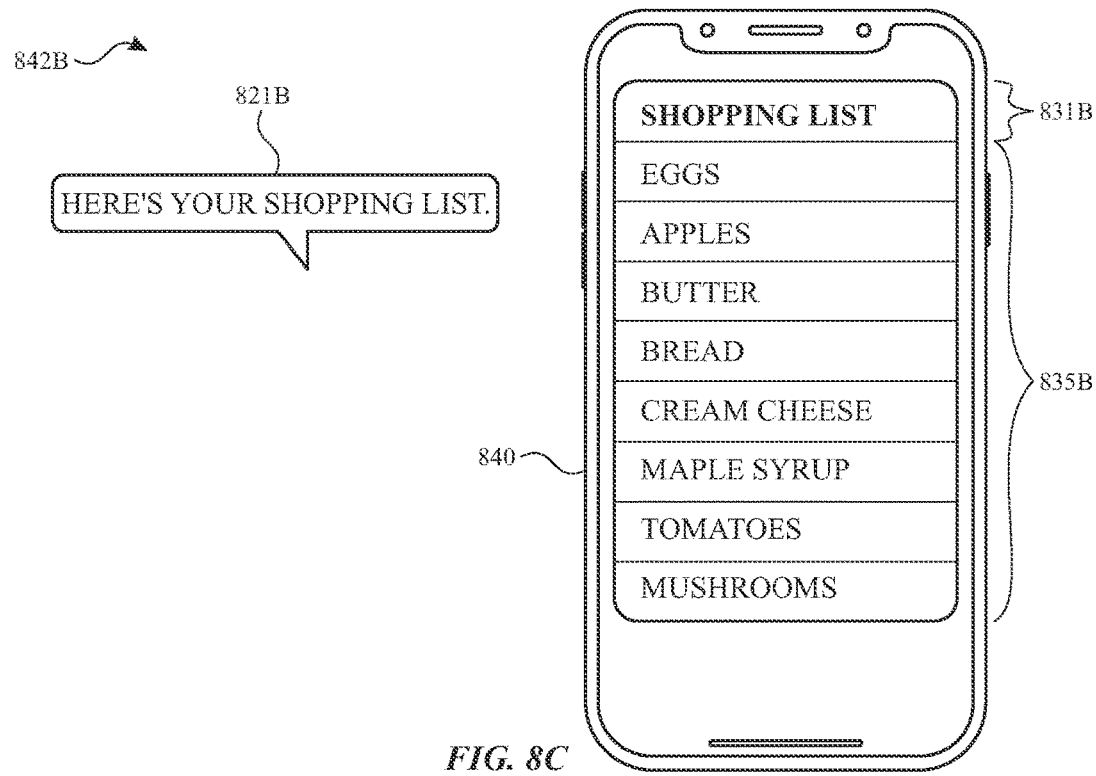

FIG. 8C illustrates delivering an output in a visual-forward output mode according to output data structure 802. For example, the visual-forward mode may have been selected based on context information indicating that the user is interacting with the display of device 840, but is also interacting with a digital assistant of device 840 using voice control. Referring momentarily to FIG. 8A, according to output data structure 802, a full degree of visual output includes the visual pattern components header 831 and item 835, and a supporting degree of audio output includes the audio pattern component intro 821. Accordingly, like output 842A, output 842B includes a header display element 831B (Shopping List) and item display element 835B (eggs, apples, butter, bread, cream cheese, maple syrup, tomatoes, mushrooms), displayed on the display of device 840. Additionally, output 842B includes supporting audio content, intro dialog 821B ("Here's your Shopping List"), for instance, delivered as audible synthesized speech of the digital assistant.

As discussed with respect to FIG. 8B, in some embodiments, the pattern components included in the output (e.g., intro 821, header 831, and item 835) are populated with sets of output data corresponding to the respective output groups for the pattern components to generate the output components for delivery. In embodiments where the sets of data are received from a task flow using the one or more data fields corresponding to one or more of output groups 810, the same set of data is used to populate each of the pattern components included in the corresponding output group. For example, both the audio pattern component intro 821 and the visual pattern component header 831 are populated with the output data corresponding to output group 811 (e.g., the received list name, "Shopping List"), thus generating both header display element 831B ("Shopping List") and intro dialog 821B ("Here's your Shopping List") with the same data.

Figure 8D:
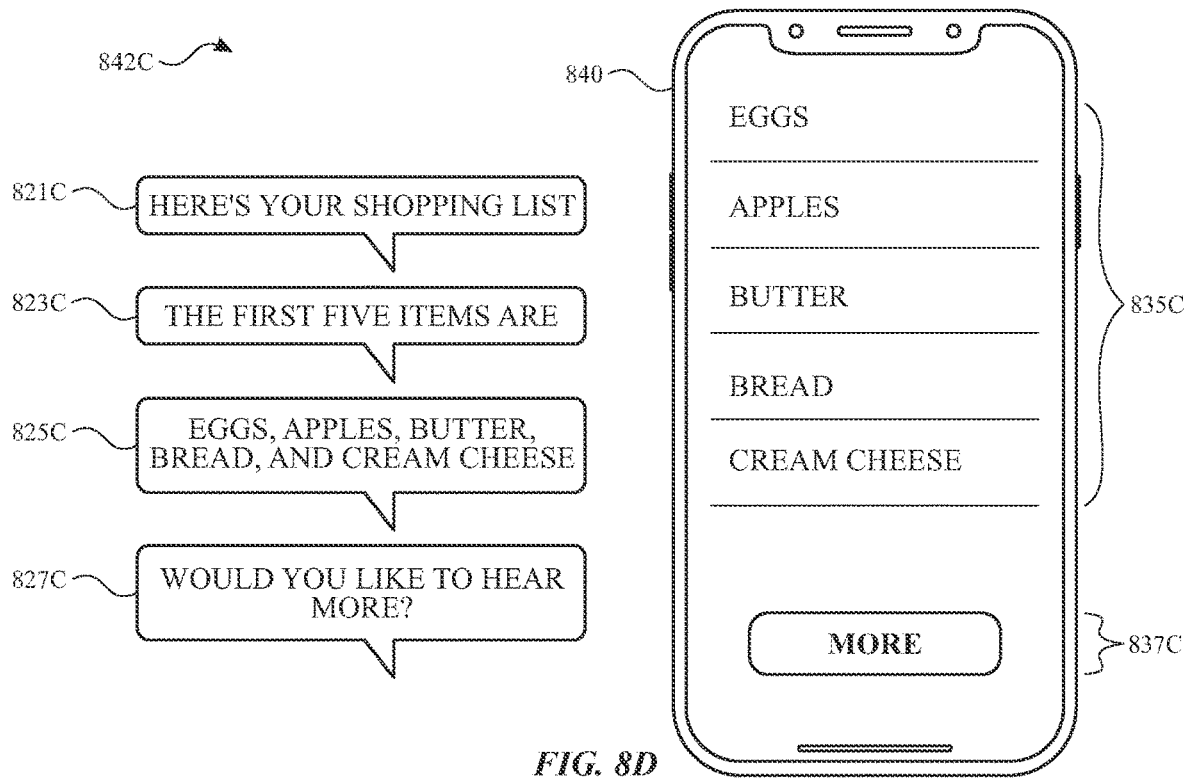
Figure 8E:
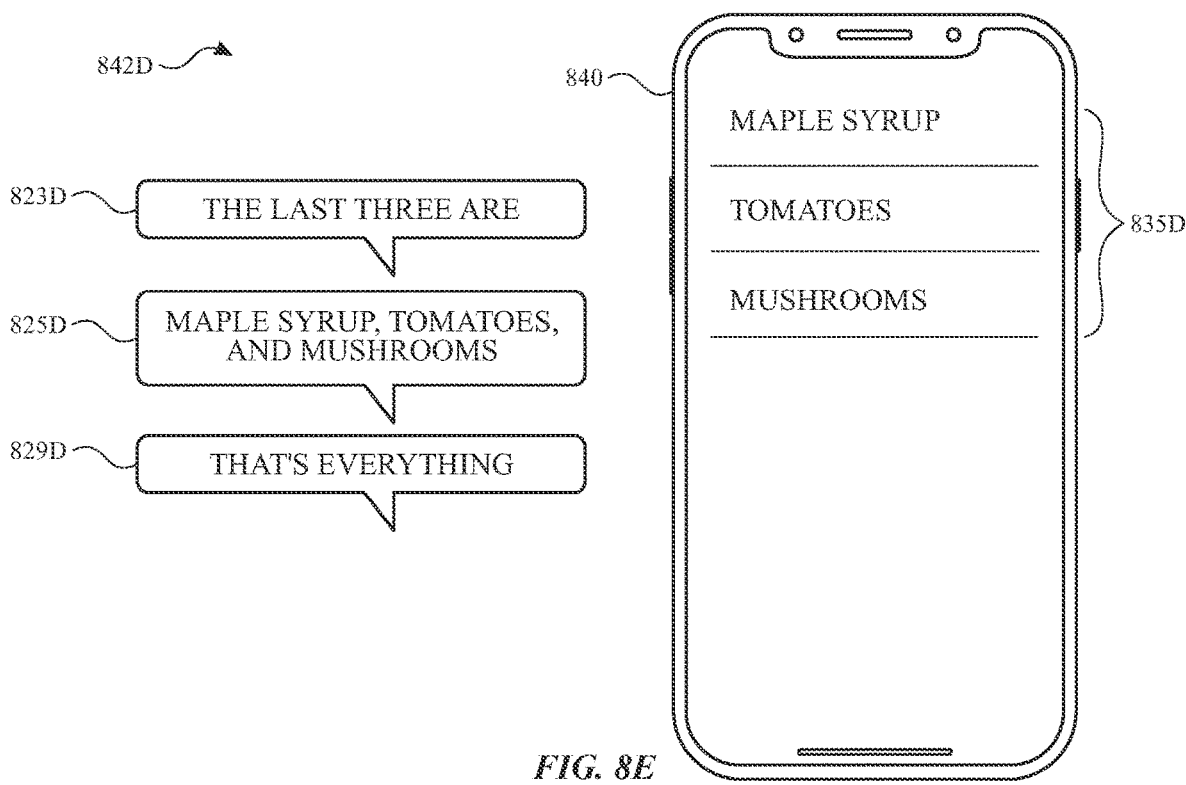

FIGS. 8D-8E illustrate delivering an output in an audio-forward output mode according to output data structure 802. For example, the audio-forward mode may have been selected based on context information indicating that the user is currently driving, with device 840 placed in a hands-free mode. Referring momentarily to FIG. 8A, according to output data structure 802, a full degree of audio output can include some or all of the audio pattern components intro 821, window intro 823, list item statement 825, continuation prompt 827, and conclusion 829; and a supporting degree of visual output can include some or all of the visual pattern components subheader 833, item 835, and button 837. In some embodiments, included the pattern components may be split across multiple output turns. For example, pattern components from a first subset of output groups are included a first-turn output 842C, and pattern components from a second subset of output groups are included in a second-turn output 842D.

In some embodiments, the subsets of output groups for each of the multiple turns are determined based on the output mode and/or a setting of output data structure 802. For example, output data structure 802 includes a maximum window size setting for audio modes, defining a maximum number of items from the result set that should be read out loud in a single turn. If the total number of items from the result set exceeds the window size setting, the output of output group 815 is split between multiple turns. For example, as illustrated in FIGS. 8D-8E, the window size setting for output data structure 802 is five items, so the output of the eight-item grocery list is split between output 842C and output 842D. Additionally, pattern components from output group 813, output group 817, and output group 819 can be included in the subsets of output groups as appropriate to frame each turn of the output.

As illustrated in FIG. 8D, output 842C (e.g., the turn 1 output) thus includes pattern components from a first subset of output groups including output group 811, output group 813, output group 815, and output group 817. Specifically, output 842C includes intro dialog 821C ("Here's your Shopping List"), window intro dialog 823C ("The first five items are"), list item statement dialog 825C ("eggs, apples, butter, bread, and cream cheese."), and continuation prompt dialog 827C ("Would you like to hear more?"). Additionally, output 842C includes supporting visual content, list display element 835C (eggs, apples, butter, bread, cream cheese) and button display element 837C (More).

In some embodiments, as discussed above, some pattern components included in the output (e.g., intro 821, list item statement 825, and item 835) are populated with sets of output data corresponding to the respective output groups for the pattern components to generate the output components for delivery. In some embodiments, some pattern components included in the output (e.g., window intro 823, list item statement 825, and item 835) are populated based on a setting of output data structure 802. For example, list item statement dialog 825C and list display element 835C each include the first five items (e.g., a five-item window) of the output data corresponding to output group 815 (e.g., the grocery list). As another example, window intro 823 is populated with the window size (e.g., "five") to generate window intro dialog 823C ("The first five items are").

As noted above, in order to frame output 842C as a first turn of a multi-turn output, output 842C includes audio pattern component window intro 823 from output group 813, audio pattern component continuation prompt 827 from output group 817, and visual pattern component button 837 from output group 817. Window intro 823 provides the user with an initial indication that the result set output will be split between multiple turns. Continuation prompt 827 and button 837 indicate how the user can proceed to the next turn of output (e.g., output 842D). For example, the user can provide a speech input (e.g., "Yes," "Okay," "No") in response to continuation prompt dialog 827C ("Would you like to hear more?"), or the user can use a touch input to select button display element 837C (More).

As illustrated in FIG. 8E, output 842D (e.g., the turn 2 output) includes pattern components from a second subset of output groups including output group 813, output group 815, and output group 819. Specifically, output 842D includes window intro dialog 823D ("The last three are"), list item statement dialog 825D ("maple syrup, tomatoes, and mushrooms."), and conclusion dialog 829D ("That's everything"). Additionally, output 842C includes supporting visual content, list display element 835D (maple syrup, tomatoes, mushrooms). In some embodiments, output 842D is provided in response to receiving a user input, for example, a speech input with an affirmative response (e.g., "Yes," "Okay") to continuation prompt dialog 827C or a touch input selection of button display element 837C (More).

In some embodiments, the output groups included in the second subset (turn 2) overlap with the output groups included in the first subset (turn 1), and the pattern components included in the second-turn output (e.g., 842D) overlap with the pattern components included in the first-turn output (e.g., 842C). That is, the same pattern component may be used to generate multiple instances of output components to include in the multiple output turns. For example, the audio pattern component window intro 823 is used to generate both a first instance, window intro dialog 823C ("The first five items are"), and a second instance, window intro dialog 823D ("The last three are"), of the output component.

Figure 8F:
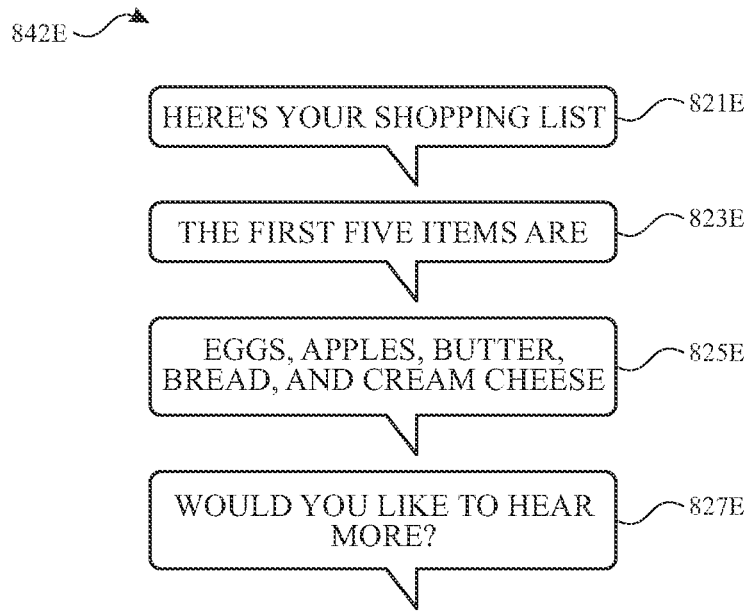
Figure 8G:
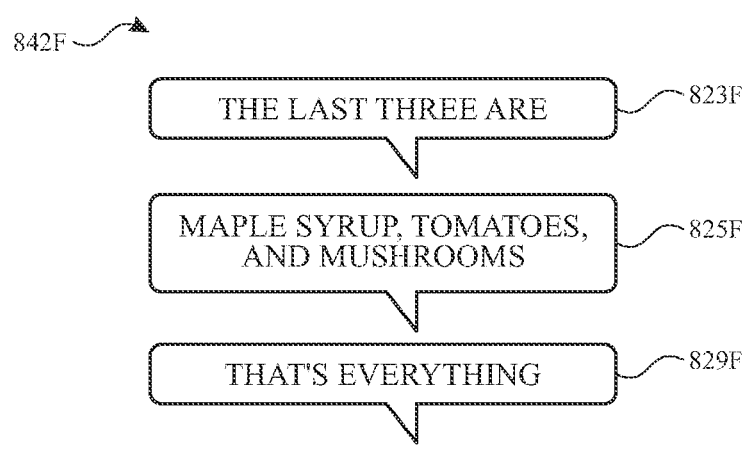

FIGS. 8F-8G illustrate delivering an output in an audio-only output mode according to output data structure 802. For example, the audio-only mode may have been selected based on context information indicating that the user is currently on a run and not interacting with the display of device 840. As with FIGS. 8D-8E, a full degree of audio output can include some or all of the audio pattern components intro 821, window intro 823, list item statement 825, continuation prompt 827, and conclusion 829, which may be split across multiple output turns. For example, pattern components from a first subset of output groups are included a first-turn output 842E, and pattern components from a second subset of output groups are included in a second-turn output 842F.

As illustrated in FIG. 8F, output 842E (e.g., the turn 1 output) thus includes pattern components from a first subset of output groups including output group 811, output group 813, output group 815, and output group 817, selected and populated as described above. Specifically, output 842E includes intro dialog 821E ("Here's your Shopping List"), window intro dialog 823E ("The first five items are"), list item statement dialog 825E ("eggs, apples, butter, bread, and cream cheese."), and continuation prompt dialog 827E ("Would you like to hear more?"), for instance, delivered as audible synthesized speech of the digital assistant. As the output mode is an audio-only mode, output 842E does not include any visual output components.

As illustrated in FIG. 8G, output 842F (e.g., the turn 2 output) includes pattern components from a second subset of output groups including output group 813, output group 815, and output group 819, selected and populated as described above. Specifically, output 842F includes window intro dialog 823F ("The last three are"), list item statement dialog 825F ("maple syrup, tomatoes, and mushrooms."), and conclusion dialog 829F ("That's everything"). In some embodiments, output 842D is provided in response to receiving a user input, for example, a speech input with an affirmative response (e.g., "Yes," "Okay") to continuation prompt dialog 827E.

The operations described above with reference to FIGS. 8A-8G are optionally implemented by components depicted in FIGS. 1-4, 6A-6B, and 7A-7C. For example, the operations of system 800 may be implemented by one or more electronic devices (e.g., 104, 122, 200, 400, 600, 840) such as one implementing system 700 It would be clear to a person having ordinary skill in the art how other processes are implemented based on the components depicted in FIGS. 1-4, 6A-6B, and 7A-7C.

Figure 9:
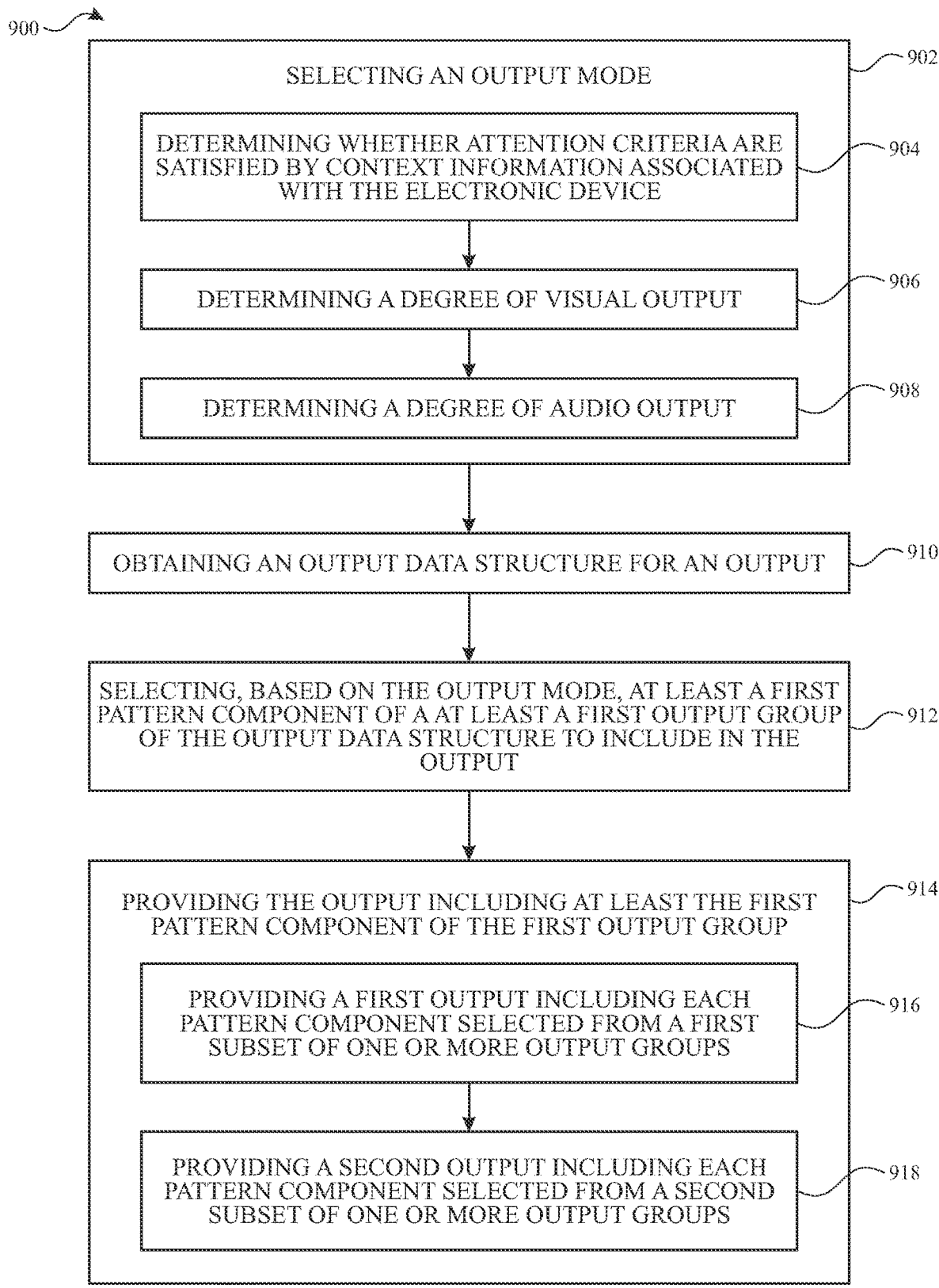
FIG. 9 is a flow diagram illustrating a method for providing outputs to a user formatted based on an output mode, according to various examples.

FIG. 9 is a flow diagram illustrating method 900 for providing outputs to a user formatted based on an output mode in accordance with some embodiments. Method 900 may be performed using one or more electronic devices (e.g., device 104, device 200, device 600, device 840) with one or more processors and memory. In some embodiments, method 900 is performed using a client-server system, with the operations of method 900 divided up in any manner between the client device(s) (e.g., 104, 200, 600, 840) and the server. Some operations in method 900 are, optionally, combined, the orders of some operations are, optionally, changed, and some operations are, optionally, omitted.

At block 902, an output mode is selected. For example, an electronic device (or a suite of multiple electronic devices) may be able to produce visual outputs (e.g., content displayed on a display, such as a monitor or touch-sensitive screen) and/or audio outputs (e.g., dialog, sounds, and/or music played through speakers or headphones). Accordingly, in some embodiments, available output modes include not only an audio-only mode and a visual-only (e.g., silent) mode, but also mixed modes, such as an audio-forward mode (e.g., primarily audio output, with supporting visual content) and/or a visual-forward mode (e.g., primarily visual output, with supporting audio content).

In some embodiments, selecting the output mode is performed based on context information associated with the electronic device(s) performing method 900. For example, context information associated with the electronic device(s) may include sensor data, device connectivity data, location data, movement data, digital assistant session context, device settings, device type, application data, and/or the like. Accordingly, in some embodiments, method 900 can select the output mode based on what would be most appropriate for the user's current situation.

In some embodiments, device type information may indicate a mode capability of the device, such as whether the device has or is connected to a display (e.g., a touch sensitive display, a TV, etc.) capable of displaying visual content, or whether the device has or is connected to an audio output device (e.g., headphones, speakers, etc.) capable of playing back audio content. For example, a smart speaker-type device without a display may only support an audio-only mode, or may require connectivity to an additional device (e.g., a mobile phone such as device 840) in order to support other modes. In some embodiments, device type information may indicate a preferred output mode for a device category. For example, a smart TV-type device may generally use a visual-forward or visual output mode, even if the TV is capable of outputting audio.

In some embodiments, at block 904, selecting the output mode based on context information includes determining whether attention criteria are satisfied by the context information. In some embodiments, the attention criteria may include whether the user is looking at a display of the electronic device (e.g., using gaze or head-orientation detection techniques; using recent interaction data for a touch-sensitive display; etc.), whether the user is listening to the electronic device (e.g., using sensor information for connected headphones; using recent interaction data for a microphone; etc.); whether the user is engaged in an activity (e.g., using location data, movement data, application data, etc.); and so forth.

For example, determining whether attention criteria are satisfied may include determining that the device is a vehicle interface-type device, and that the vehicle is currently moving. If the vehicle is currently moving (e.g., the user is driving), an audio-forward or audio-only mode may be selected to avoid diverting the user's attention from driving to a look at a display. As another example, location data, movement data, and application data (e.g., of a fitness application) may indicate that the user is currently engaged in a workout and wearing connected headphones, which indicates that an audio-forward or audio-only mode may be most appropriate.

In some embodiments, selecting the output mode includes, at block 906, determining a degree of visual output and, at block 908, determining a degree of audio output. For example, as illustrated in FIG. 8A, the output may be provided with full, supporting, or no audio content, and full, supporting, or no visual content. In some embodiments, the degree of visual output is determined relative to the degree of audio output (e.g., a sliding scale of visual to audio output). For example, as illustrated in FIGS. 8A-8G, when a full degree of audio output is selected, either supporting or no visual content is provided, and when a full degree of visual output is selected, either supporting or no audio content is provided. In some embodiments, the degrees of visual and audio output may be determined based on the attention criteria, such that a user paying attention to a display may be provided with a fuller degree of visual content, while a user not paying attention to a display may be provided with a fuller degree of audio content.

In some embodiments, depending on the output mode selected (e.g., the degree of audio and/or visual output that would be appropriate for the user's current situation), the formatting of the output will differ. That is, in a multimodal output system, the same information can be conveyed to the user in a variety of ways. For example, the raw information to be output (e.g., a forecast of 72° and sunny) may be formatted as dialog to be delivered audibly as synthesized speech of a digital assistant (e.g., a full, conversational sentence, such as "Today will be 72° and sunny") or as text, images, or other visual elements to be displayed (e.g., a widget displaying the temperature 72° as text and a sun icon).

At block 910, in accordance with a determination that an output is to be provided by the electronic device(s), an output data structure for the output is obtained. For example, the output to be provided to a user may include a task result, a request for clarification (e.g., disambiguation request), and/or a status update (e.g., a notification of task success, task failure, or pending task status).

In some embodiments, the determination that an output is to be provided by the electronic device(s) is received from a digital assistant of the electronic device(s) (e.g., digital assistant system 700). For example, a user may invoke a digital assistant to perform a task, such as sending a message (e.g., "Hey Siri, text John that I'm on my way"), answering a question, providing a weather forecast, searching for nearby restaurants, retrieving a grocery list, or the like. As described above with respect to digital assistant system 700, the digital assistant processes the user request and initiates a task flow for the task. At certain points in the task flow, the task flow will indicate that an output is to be provided, such as the result of the task (e.g., the answer to the question, the weather forecast, a list of nearby restaurants, or the grocery list), a request for clarification (e.g., asking which "John" the user would like to text), or a status update (e.g., indicating that a message was successfully sent, or that the task failed).

In some embodiments, the output data structure represents a pattern used to format the contents of the output (e.g., the result, clarification, or status) for delivery according to various output modes (e.g., audio-only, audio-forward, visual-forward, or visual-only). Accordingly, in some embodiments, the output data structure (e.g., pattern) is domain independent, as the output data structure can be applied to output results, clarifications, and statuses for many different use cases (e.g., tasks) and types of content. For example, the same output data structure can be applied to format a weather forecast for Los Angeles, CA or a weather forecast for Milwaukee, WI (e.g., content agnostic). As another example, the same output data structure can be applied to format a list of nearby restaurants from a search task or a grocery list from an information retrieval task (e.g., use case agnostic).

In some embodiments, the output data structure is obtained (e.g., selected) from a set of output data structures. For example, the set of output data structures may include result patterns (e.g., simple result, detailed result, result set, multi-level result set, table set, and variable result set), status patterns (e.g., success status, error status, cancelled status, and progress status), and clarification patterns (e.g., yes/no clarification, open-ended clarification, simple disambiguation clarification, and detailed disambiguation clarification). As output data structures included in the set are domain independent, the set can be relatively small in size, while still being applicable to numerous different output domains (e.g., different use cases and contents). For example, the simple result data structure may be used to format digital assistant responses to requests such as "When is Memorial Day," "How deep is Lake Michigan," "Who directed CODA," and so forth. As another example, the open-ended clarification data structure may be used to format follow-up requests from a digital assistant, such as "What day would you like to make a reservation for?," "What music do you want to play?," "When should I set an alarm for?," and the like.

In some embodiments, the output data structure is selected from the set of output data structures based on a task flow. In some embodiments, the task flow includes logic for selecting an appropriate output data structure for different states and steps of the task flow. For example, in response to receiving a user input requesting to send a message (e.g., "Hey Siri, text John that I'm on my way"), a digital assistant may initiate a task flow for sending a message. If the task flow for sending a message requires more information to proceed, the task flow may indicate that a clarification output data structure should be selected (e.g., a simple disambiguation clarification to ask the user to select John's work number or personal number, or a yes/no clarification to ask the user if "John Doe" is the intended "John"). If the task flow indicates that the message has been successfully sent, the task flow may indicate that a status output data structure should be selected (e.g., a success status to inform the user the message has been sent).

The output data structure obtained in block 910 includes one or more output groups (e.g., output groups 810), each of which includes one or more pattern components (e.g., audio pattern components 820, visual pattern components 830). In some embodiments, the one or more pattern components represent multimodal "building blocks" (e.g., templates) that can be populated with information and assembled in various configurations to generate a formatted output. For example, a simple result output data structure may include audio output components such as a statement (e.g., "Iza Ramen is 1 mile away and rated four stars on Yelp.") and/or a disambiguation prompt (e.g., "Do you want to call or get directions?"), and visual output components such as a summary item (e.g., an informational widget about Iza Ramen) and/or a button area (e.g., with buttons labeled "Call" or "Directions").

In some embodiments, the one or more pattern components include at least one audio pattern component. For example, an audio pattern component may include a line of dialog (e.g., synthesized speech), a sound, music, or the like. In some embodiments, the audio pattern components include one or more templates for generating an audio output component. For example, for a result set output data structure such as the example illustrated in FIGS. 8A-8G, the audio pattern component intro 821 may include dialog templates (e.g., scripts) such as "Here's your $list_title:" which can be used to generate output dialog such as "Here's your Shopping List:" or "Here's your To-Do List:" (e.g., for $list_title variable values "Shopping List" or "To-Do List"). In some embodiments, an audio pattern component may include multiple template options, such as alternative dialog templates "Here's what I found:" or "Here you go:" for intro 821.

In some embodiments, the one or more pattern components include at least one visual pattern component. For example, a visual pattern component may include displayed text, images, user interface affordances (e.g., buttons, sliders, or links), or other display elements (e.g., lines, shapes, bullets, etc.). In some embodiments, the visual pattern components include one or more templates for generating a visual output component. For example, for a result set output data structure such as the example illustrated in FIGS. 8A-8G, the visual pattern component item 835 may include visual templates for displaying a list, such as the horizontal-line delineated text list illustrated in FIG. 8B (e.g., item display element 835A). In some embodiments, a visual pattern component may include multiple template options, such as alternative visual templates for displaying item 835 (e.g., the result set) as a text block (e.g., a paragraph), a table, a visualizer, or the like. In some embodiments, a visual pattern component may include multiple versions of a template, each corresponding to a different device type (e.g., a mobile phone, smart watch, smart glasses, television, laptop, or the like), in order to format the display elements for that device type's display specifications. For example, while the contents (e.g., information and display elements) of a visual pattern component remain the same, a version of the visual pattern component template corresponding to a mobile phone-type device may arrange the contents as a partial-screen banner, while a version of the visual pattern component template corresponding to a smart watch-type device may arrange the contents as a full-screen display.

As noted above, the pattern components of the output data structure obtained in block 910 are organized into the one or more output groups. In some embodiments, the one or more output groups represent groups of pattern components that serve equivalent or similar roles in conveying an output, including pattern components for different modes of output (e.g., audio vs. visual). For example, as illustrated in FIGS. 8A-8G, the pattern components of output group 811, the audio pattern component intro 821 (e.g., "Here's your shopping list") and the visual pattern component header 831 (e.g., the text header "Shopping List"), both serve to initially contextualize the result. As another example, in a simple result output data structure, the disambiguation prompt (e.g., "Do you want to call or get directions?") and the button area (e.g., with buttons labeled "Call" or "Directions") are included in the same group, as both request user input on a potential follow-up task.

In some embodiments, at least a first output group of the one or more output groups is required, such that at least one of the one or more pattern components included in the required output group must be included in a proper output. For instance, as illustrated in FIGS. 8A-8G, at least one of the pattern components included in output group 815 (list item statement 825 and item 835) must be included in a proper result set output. In some embodiments, at least a second output group of the one or more output groups optional. For example, in the simple result output data structure, the output group including the disambiguation prompt and the button area may be optional, and only included if a task flow indicates the possibility of a follow-up prompt.

In some embodiments, the output data structure includes an input data field for one or more sets of output data received from a task flow. For example, because the output data structure is domain independent, the domain-specific contents of the output (e.g., actual information to be delivered to the user) can be passed to the output data structure from a task flow via the data fields, for instance, in the form of parameter or variable values.

In some embodiments, the input data field corresponds to at least one output group of the one or more output groups (e.g., such that the pattern components included in the corresponding output group are populated with the same task information or data). As noted above, in some embodiments, the one or more output groups represent groups of pattern components that serve equivalent or similar roles in conveying an output, so the same input data set can be efficiently used to populate the pattern components of the group, rather than requiring separate input data sets for each potential output mode or pattern component. For example, as discussed with respect to FIGS. 8A-8G, a task flow for retrieving a list may pass the list title ("Shopping List") to an input data field corresponding to output group 811 and the list contents (eggs, apples, butter, etc.) to an input data field corresponding to output group 815, which can then be formatted according to any (or all) of the pattern components included in those groups.

At block 912, based on the output mode (e.g., the output mode selected at block 902), at least a first pattern component of at least a first output group of the output data structure is selected to include in the output. In some embodiments, a determination is made whether the audio component for the group, the visual component for the group, or both should be used in an output for the selected output mode (e.g., audio-only, audio-forward, visual-forward, or visual-only). For example, an output group for a simple result output data structure may include a "statement" audio pattern component and a "summary item" visual pattern component. Based on a visual-only output mode, the summary item visual pattern component (e.g., an informational widget about Iza Ramen) is selected from the output group and the statement is omitted. Likewise, based on an audio-only output mode, the statement audio pattern component (e.g., dialog such as "Iza Ramen is 1 mile away and rated four stars on Yelp.") is selected to include in the output. For a visual-forward or audio-forward output mode, both pattern components in the group may be selected for inclusion in the output (e.g., providing some redundancy in the output, where the information is conveyed both visually and audibly).

In some embodiments, if the selected first pattern component includes multiple versions of a template, this determination includes selecting which template should be used. For example, a task flow for retrieving a list may specify whether to use an item display element template (e.g., a displayed list, such as item display element 835A illustrated in FIG. 8B), a text block display element template, or a table display element template to output a list of items in a result set output. As another example, a specific version of a pattern component template may be chosen based on the sets of output data received via the one or more input data fields, such as selecting the dialog script "Here's your $list_title:" when the sets of output data include a value for the variable $list_title, and selecting the dialog script "Here you go:" when no $list_title value is received. As another example, a task flow may include logic for selecting a template version, such as only including an attribution statement (e.g., "According to the Weather Channel . . . ") once every five times a particular audio pattern component is used.

In some embodiments, the first output group is included in a first subset of output groups selected from the one or more output groups of the output data structure. In some embodiments, the first subset of output groups represents an entire output, and include all of the required output groups and any additional optional output groups (e.g., optional output groups designated for inclusion by a task flow, or optional output groups for which a set of input data was provided by the task flow). For example, as illustrated in FIG. 8B, output 842A includes only the subset of output groups including output group 811 and output group 815, and represents a complete output. In some embodiments, the first set of output groups represents a first-turn output of a multi-turn output, and may not include all of the required output groups (e.g., as later turns of the multi-turn output will complete the requirements of the output data structure). For example, as illustrated in FIG. 8D, output 842C includes only the subset of output groups including output group 811, output group 813, output group 815, and output group 817.

In some embodiments, the first subset of output groups is selected from the output data structure based on the output mode. For example, as illustrated in FIGS. 8B-8C, in visual-only and visual-forward output modes, information can be presented with relatively little framing and remain clear to the user, so the first subset of output groups for these modes includes only output group 811 and output group 815. As another example, as illustrated in FIGS. 8D and 8F, in audio-forward and audio-only output modes, more dialog is included to contextualize the output for the user, so the first subset of output groups for these modes further include output group 813 and output group 817 (e.g., to create a more conversational, easy-to-understand dialog).

In some embodiments, the first subset of output groups is selected from the output data structure based on a setting of the output data structure. In some embodiments, a task flow may include customized settings for which pattern components of an optional output group are toggled "on" and "off" for given output modes (e.g., customized settings for the checked and unchecked pattern components shown for output data structure 802 in FIG. 8A). For example, a task flow for delivering restaurant information may specify that both a required information output group and an optional follow-up task output group from a simple result output data structure should be included, since a result delivering restaurant information will frequently result in a follow-up task request (e.g., to call the restaurant or to get directions to the restaurant) from the user.

In some embodiments, the setting of the output data structure used to select the first subset of output groups is determined based on the output mode. For example, as illustrated in FIGS. 8D and 8F, in the audio-only and audio-forward output modes, a window size setting is set to only five items, since reading a long list of items out loud can hinder user comprehension. Accordingly, since the window size for the output mode requires a multi-turn output (e.g., a first turn for the first five items and a second turn for the remaining three items in the grocery list), the first subset of output groups incudes output group 813 and output group 817 to frame the first-turn output in addition to the required output groups 811 and 815. As another example, as illustrated in FIGS. 8B-8C, a window size setting for the visual-only and visual-forward output modes is greater than eight items. Accordingly, the first subset of output groups includes only output group 811 and output group 815, since the entire contents of those groups (e.g., the list title and list contents) can be provided in a single turn in the visual format.

In these embodiments, based on the output mode, at least one pattern component from each output group of the first subset of output groups, including the first pattern component from the first output group, is selected to include in the output. In some embodiments, only one pattern component is selected from each output group of the first subset of output groups, such as for an output in an audio-only or visual-only output mode. In some embodiments, multiple pattern components may be selected from a single output group of the first subset of output groups, such as for an output in an audio-forward or visual-forward (e.g., mixed-mode) output mode. For example, as illustrated in FIGS. 8B-8C, both output 842A and output 842B include output group 811, but output 842A for the visual-only mode includes only the visual pattern component header 831, while output 842B for the visual-forward mode includes both header 831 and the audio pattern component intro 821.

In some embodiments, in addition to selecting a first subset of output groups (e.g., including the first output group), a second subset of output groups is selected from the one or more output groups of the output data structure. For example, the second set of output groups may represent a second-turn output of a multi-turn output, and may include any remaining required output groups, any additional optional output groups, and/or any additional instances of the output groups included in the first subset of output groups. As with the first subset of output groups, in some embodiments, the second subset of output groups is selected based on the output mode and/or a setting of the output data structure.

In these embodiments, based on the output mode, at least one pattern component from each output group of the second subset of output groups is selected to include in the output. In some embodiments, only one pattern component is selected from each output group of the second subset of output groups, such as for an output in an audio-only or visual-only output mode. In some embodiments, multiple pattern components may be selected from a single output group of the second subset of output groups, such as for an output in an audio-forward or visual-forward (e.g., mixed-mode) output mode.

Although these embodiments are described with respect to a first and second subset of output groups, it should be understood that a multi-turn output may include selecting a respective subset of output groups for each turn necessary to complete the multi-turn output (e.g., a third, fourth, and fifth subset of output groups for third-, fourth-, and fifth-turn outputs).

At block 914, the output, including at least the first pattern component of the first output group, is provided. For example, as illustrated in FIGS. 8A-8G, outputs 842A-842F are provided, each including configurations of the grouped pattern components of output data structure 802.

In some embodiments, providing the output includes, at block 916, providing a first output including each pattern component selected from the first subset of output groups. For example, as shown in FIG. 8B, output 842A is a first and only (e.g., complete) output, and includes the pattern components header 831 (header display element 831A) and item 835 (item display element 835A) from the first (and only) set of output groups (output group 811 and output group 815). As another example, as shown in FIG. 8D, output 842C is a first-turn output of a multi-turn output (e.g., as continued in FIG. 8E), and includes pattern components intro 821, header 831, window intro 823, list item statement 825, item 835, continuation prompt 827, and button 837, from the first set of output groups (output group 811, output group 813, output group 815, and output group 817).

In some embodiments, providing the output includes populating the first pattern component of the first output group with output data for the first output group to generate a first output component, and delivering the first output component. For example, as illustrated in FIGS. 8D, templates included in audio pattern components intro 821, window intro 823, list item statement 825, and continuation prompt 827 are populated with grocery list data to be output to the user to generate the audio output components intro dialog 821C ("Here's your Shopping List"), window intro dialog 823C ("The first five items are:"), list item statement dialog 825C ("eggs, apples, butter, bread, and cream cheese"), and continuation prompt dialog 827C ("Would you like to hear more?"), which are provided through a speaker or headphone of device 840. Likewise, templates included in visual pattern components item 835 and button 837 are populated with the grocery list data to be output to the user to generate display elements item display element 835C and button display element 837C, which are displayed on the display of device 840.

In some embodiments, populating the first pattern component to generate the first output component is performed based on a setting of the output data structure. In some embodiments, output data structure settings may include which conjunction to use in a list (e.g., "and" or "or"), a window size (e.g., how many items can be included in a single output turn), or any other domain-independent formatting guidelines for audio or visual outputs. For example, as illustrated in FIGS. 8D-8G, audio pattern component window intro 823 may include the dialog script "The $ordinal $window_size items are:", where the variable $window_size is populated based on the window size setting (e.g., "five," "three") and the variable $ordinal is populated with the turn order (e.g., "first," "last"). As another example, a multi-level result set output data structure may include a setting for how to indent each level of a nested list in a visual output component. In some embodiments, populating the first pattern component to generate the first output component is performed based on context information associated with the electronic device(s), such as using the device type (e.g., a mobile phone, smart watch, smart glasses, television, laptop, or the like) to select a corresponding version of a template included in the first pattern component to populate.

In some embodiments, the output data for the first output group is received from a task flow. As noted above, output data structures and the pattern components and output groups included within are domain-independent, as they can be applied to format and deliver outputs from a variety of tasks and content. Accordingly, the actual information to be output to the user (e.g., the output data used to populate the selected pattern components) is passed to the output data structure (e.g., via the one or more input data fields described above) from a domain-specific task flow, such as a task flow for a digital assistant.

For example, as described with respect to FIGS. 8A-8B, the visual pattern component item 835 is populated with the contents of the grocery list (e.g., the output data for output group 815) received from a task flow to generate the visual output component, item display element 835A. As another example, as described with respect to FIGS. 8A and 8C, the audio pattern component intro 821 is populated with the list title (e.g., the output data for output group 811) received from the task flow to generate the audio output component, intro dialog 821B.

In some embodiments, a second pattern component of the first output group is populated with the output data for the first output group to generate a second output component, and the second output component is also delivered. In some embodiments, the second pattern component is an additional instance of the first pattern component (e.g., a second-turn instance of the same pattern component), and the output data for the first output group is subdivided between the two output components. For example, as illustrated in FIGS. 8D-8E, which illustrate multi-turn outputs, the audio pattern component item statement 825 is populated with the contents of the grocery list not only to generate list item statement dialog 825C (e.g., the first output component), but also list item statement dialog 825D (e.g., the second output component), each including part of the contents of the grocery list (e.g., the output data for output group 815). In such embodiments, the second output component is delivered after the first output component is delivered (e.g., as part of a second output turn).

In some embodiments, the second pattern component is a different pattern component than the first pattern component (albeit still a pattern component from the first output group). For example, as illustrated in FIG. 8C, not only is the audio pattern component intro 821 populated with the grocery list title to generate intro dialog 821B (e.g., the first output component), but the visual pattern component header 831 is also populated with the grocery list title to generate header display element 831B (e.g., the second output component). That is, in some embodiments, the output includes some redundancy across output modes, where both visual and audio output components are used to convey the same information. In such embodiments, the second output component is delivered in the same turn as the first output component (e.g., such that intro dialog 821B can be heard at the same time header display element 831B is being displayed).

Although these embodiments are described with respect to providing the output including at least the first pattern component of the first output group, it should be understood that an output may include various configurations of one or more pattern components from one or more output groups delivered across one or more turns.

In some embodiments, providing the output includes, at block 918, providing a second output including each pattern component selected from the second subset of output groups (e.g., populated with output data as described above to generate the output components of the second output). For example, as shown in FIGS. 8E and 8G, the second output is a second-turn output including each pattern component selected from output groups 813, 815, 817, and 819. In some embodiments, providing the second output is performed in response to receiving a user input responding to the first output. For example, as shown in FIGS. 8D-8G, output 842D and output 842F (e.g., the second-turn outputs) may only be delivered after a user has responded in the affirmative to output 842C or 842E (e.g., by providing a spoken output such as "Yes" or "Okay" or by selecting button display element 837C).

The operations described above with reference to FIG. 9 are optionally implemented by components depicted in FIGS. 1-4, 6A-6B, 7A-7C, and 8A-8G. For example, the operations of method 900 may be implemented according to system 800, which may be implemented on one or more electronic devices, such as device 840. It would be clear to a person having ordinary skill in the art how other processes are implemented based on the components depicted in FIGS. 1-4, 6A-6B, and 7A-7C.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the provision of an output formatted according to output mode. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to help select the output mode, select the pattern components to include, or generate the formatted output. Accordingly, use of such personal information data guides appropriate formatting of an output for a user's circumstances. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of automatic output formatting services, the present technology can be configured to allow users to select to "opt in" or "opt out" of participation in the collection of personal information data during registration for services or anytime thereafter. In another example, users can select not to provide mood-associated data for automatic output formatting services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, appropriate output modes and pattern components can be selected by inferring context based on non-personal information data or a bare minimum amount of personal information, such as the content being requested by the device associated with a user, other non-personal information available to the output formatting services, or publicly available information.

What is claimed is:

1. An electronic device, comprising:
one or more processors;
a memory; and
one or more programs, wherein the one or more programs are stored in the memory and configured to be executed by the one or more processors, the one or more programs including instructions for:
selecting, based on a determination of whether attention criteria are satisfied by context information associated with the electronic device, an output mode, wherein the context information includes gaze data;
in accordance with a determination that an output is to be provided by the electronic device, obtaining an output data structure for the output, wherein the output data structure includes two or more output groups, wherein each output group includes two or more pattern components, and wherein the two or more output groups represent groups of the two or more pattern components that serve similar roles in conveying the output;
selecting, based on the output mode, at least a first pattern component from at least a first output group of the output data structure to include in the output; and
providing the output including at least the first pattern component of the first output group.

2. The electronic device of claim 1, wherein selecting the output mode includes determining a degree of visual output and determining a degree of audio output.

3. The electronic device of claim 2, wherein the degree of visual output is determined relative to the degree of audio output.

4. The electronic device of claim 1, wherein the context information associated with the electronic device includes a type of the electronic device.

5. The electronic device of claim 1, wherein the output data structure includes an input data field for one or more sets of output data received from a task flow, wherein the input data field corresponds to at least one output group of the one or more output groups.

6. The electronic device of claim 1, wherein obtaining the output data structure includes selecting the output data structure from a set of output data structures based on a first task flow.

7. The electronic device of claim 1, the one or more programs further including instructions for:
selecting a first subset of the one or more output groups, wherein the first subset includes at least the first output group;
selecting, based on the output mode, at least one pattern component from each output group of the first subset, including the first pattern component selected from the first output group; and
wherein providing the output includes providing a first output including each pattern component selected from the first subset.

8. The electronic device of claim 7, wherein the first subset is selected based on the output mode.

9. The electronic device of claim 7, wherein the first subset is selected based on a first setting of the output data structure.

10. The electronic device of claim 9, wherein the first setting of the output data structure is determined based on the output mode.

11. The electronic device of claim 9, the one or more programs further including instructions for:
selecting a second subset of the one or more output groups;
selecting, based on the output mode, at least one pattern component from each output group of the second subset; and
wherein providing the output includes, after providing the first output, providing a second output including each pattern component selected from the second subset.

12. The electronic device of claim 1, wherein the one or more pattern components include an audio pattern component.

13. The electronic device of claim 12, wherein the audio pattern component includes a template for generating an audio output component.

14. The electronic device of claim 1, wherein the one or more pattern components include a visual pattern component.

15. The electronic device of claim 14, wherein the visual pattern component includes a template for generating a visual output component.

16. The electronic device of claim 1, wherein providing the output including the first pattern component of the first output group includes populating the first pattern component of the first output group with output data for the first output group to generate a first output component; and
delivering the first output component.

17. The electronic device of claim 16, the one or more programs further including instructions for:
populating a second pattern component of the first output group with the output data for the first output group to generate a second output component; and
delivering the second output component.

18. The electronic device of claim 16, wherein populating the first pattern component of the first output group with the output data for the first output group is performed based on a second setting of the output data structure.

19. The electronic device of claim 16, wherein the output data for the first output group is received from a second task flow.

20. A non-transitory computer-readable storage medium storing one or more programs configured to be executed by one or more processors of an electronic device, the one or more programs including instructions for:
selecting, based on a determination of whether attention criteria are satisfied by context information associated with the electronic device, an output mode, wherein the context information includes gaze data;
in accordance with a determination that an output is to be provided by the electronic device, obtaining an output data structure for the output, wherein the output data structure includes two or more output groups, wherein each output group includes two or more pattern components, and wherein the two or more output groups represent groups of the two or more pattern components that serve similar roles in conveying the output;
selecting, based on the output mode, at least a first pattern component from at least a first output group of the output data structure to include in the output; and
providing the output including at least the first pattern component of the first output group.

21. A method, comprising:
at an electronic device with one or more processors and memory:
selecting, based on a determination of whether attention criteria are satisfied by context information associated with the electronic device, an output mode, wherein the context information includes gaze data;
in accordance with a determination that an output is to be provided by the electronic device, obtaining an output data structure for the output, wherein the output data structure includes two or more output groups, wherein each output group includes two or more pattern components, and wherein the two or more output groups represent groups of the two or more pattern components that serve similar roles in conveying the output;
selecting, based on the output mode, at least a first pattern component from at least a first output group of the output data structure to include in the output; and
providing the output including at least the first pattern component of the first output group.

22. The electronic device of claim 1, wherein the output data structure includes at least one required output group.

23. The non-transitory computer-readable storage medium of claim 20, wherein selecting the output mode includes determining a degree of visual output and determining a degree of audio output.

24. The non-transitory computer-readable storage medium of claim 20, wherein the output data structure includes an input data field for one or more sets of output data received from a task flow, wherein the input data field corresponds to at least one output group of the one or more output groups.

25. The non-transitory computer-readable storage medium of claim 20, wherein the one or more programs further include instructions for:
selecting a first subset of the one or more output groups, wherein the first subset includes at least the first output group;
selecting, based on the output mode, at least one pattern component from each output group of the first subset, including the first pattern component selected from the first output group; and
wherein providing the output includes providing a first output including each pattern component selected from the first subset.

26. The non-transitory computer-readable storage medium of claim 20, wherein providing the output including the first pattern component of the first output group includes populating the first pattern component of the first output group with output data for the first output group to generate a first output component; and delivering the first output component.

27. The non-transitory computer-readable storage medium of claim 26, wherein the one or more programs further include instructions for:
populating a second pattern component of the first output group with the output data for the first output group to generate a second output component; and
delivering the second output component.

28. The non-transitory computer-readable storage medium of claim 26, wherein populating the first pattern component of the first output group with the output data for the first output group is performed based on a second setting of the output data structure.

29. The non-transitory computer-readable storage medium of claim 26, wherein the output data for the first output group is received from a second task flow.

30. The method of claim 21, wherein selecting the output mode includes determining a degree of visual output and determining a degree of audio output.

31. The method of claim 21, wherein the output data structure includes an input data field for one or more sets of output data received from a task flow, wherein the input data field corresponds to at least one output group of the one or more output groups.

32. The method of claim 21, further comprising:
selecting a first subset of the one or more output groups, wherein the first subset includes at least the first output group;
selecting, based on the output mode, at least one pattern component from each output group of the first subset, including the first pattern component selected from the first output group; and
wherein providing the output includes providing a first output including each pattern component selected from the first subset.

33. The method of claim 21, wherein providing the output including the first pattern component of the first output group includes populating the first pattern component of the first output group with output data for the first output group to generate a first output component; and
delivering the first output component.

34. The method of claim 33, further comprising:
populating a second pattern component of the first output group with the output data for the first output group to generate a second output component; and
delivering the second output component.

35. The method of claim 33, wherein populating the first pattern component of the first output group with the output data for the first output group is performed based on a second setting of the output data structure.

36. The method of claim 33, wherein the output data for the first output group is received from a second task flow.

\* \* \* \* \*

UNITED STATES PATENT AND TRADEMARK OFFICE
CERTIFICATE OF CORRECTION

| | | |
|---|---|---|
| PATENT NO. | : 12,424,218 B2 | Page 1 of 1 |
| APPLICATION NO. | : 17/944752 | |
| DATED | : September 23, 2025 | |
| INVENTOR(S) | : Rebecca P. Fish et al. | |

It is certified that error appears in the above-identified patent and that said Letters Patent is hereby corrected as shown below:

On the Title Page

Item [72], Line 9, delete "Cupertino" and insert -- Palo Alto --, therefor.

Signed and Sealed this
Eighteenth Day of November, 2025

John A. Squires
*Director of the United States Patent and Trademark Office*